United States Patent
Li et al.

(10) Patent No.: US 7,317,874 B2
(45) Date of Patent: Jan. 8, 2008

(54) ADAPTIVE OPTICAL TRANSCEIVER FOR FIBER ACCESS COMMUNICATIONS

(75) Inventors: Wen Li, Fremont, CA (US); Qing Zhu, San Jose, CA (US)

(73) Assignee: Broadway Networks, Inc., San Jose, CA (US)

( * ) Notice: Subject to any disclaimer, the term of this patent is extended or adjusted under 35 U.S.C. 154(b) by 0 days.

(21) Appl. No.: 11/446,276

(22) Filed: Jun. 2, 2006

(65) Prior Publication Data

US 2007/0280695 A1    Dec. 6, 2007

(51) Int. Cl.
   *H04J 14/00*    (2006.01)
(52) U.S. Cl. .................... 398/72; 398/69; 398/67; 398/68; 398/70; 398/71; 398/95
(58) Field of Classification Search ............ 398/66–72, 398/79, 168, 95; 359/584–586; 372/45–46
See application file for complete search history.

(56) References Cited

U.S. PATENT DOCUMENTS

| | | | |
|---|---|---|---|
| 5,680,234 A | 10/1997 | Darcie | |
| 5,694,234 A | 12/1997 | Darcie | |
| 5,864,413 A | 1/1999 | Feldman | |
| 5,907,417 A | 5/1999 | Darcie | |
| 6,151,144 A | 11/2000 | Knox | |
| 6,304,350 B1 | 10/2001 | Doerr | |
| 6,381,047 B1 | 4/2002 | Frigo | |
| 6,411,410 B1 | 6/2002 | Wright | |
| 6,721,506 B1 | 4/2004 | Lam | |
| 6,845,117 B2* | 1/2005 | Wakisaka et al. ........ 372/46.01 |
| 2002/0039214 A1 | 4/2002 | Ruan | |
| 2002/0090023 A1* | 7/2002 | Kondou et al. ............ 375/130 |
| 2002/0186439 A1 | 12/2002 | Buabbud | |
| 2003/0076569 A1* | 4/2003 | Stevens ..................... 359/187 |
| 2003/0180049 A1 | 9/2003 | Park | |
| 2004/0091265 A1 | 5/2004 | Kim | |
| 2004/0175177 A1* | 9/2004 | Lee et al. ..................... 398/72 |
| 2005/0031357 A1* | 2/2005 | Soto et al. .................. 398/198 |
| 2005/0123298 A1* | 6/2005 | Kim et al. .................... 398/70 |
| 2006/0147211 A1* | 7/2006 | Kim et al. .................... 398/72 |
| 2006/0153566 A1* | 7/2006 | Sorin et al. ................... 398/72 |
| 2006/0182445 A1* | 8/2006 | Lee et al. ..................... 398/72 |
| 2006/0232863 A1* | 10/2006 | Nevitt et al. ................ 359/586 |
| 2007/0116466 A1* | 5/2007 | Gewirtzman et al. ......... 398/71 |
| 2007/0140693 A1* | 6/2007 | Li et al. ....................... 398/67 |
| 2007/0165688 A1* | 7/2007 | Lee et al. ..................... 372/71 |

* cited by examiner

*Primary Examiner*—Kenneth Vanderpuye
*Assistant Examiner*—Phyowai Lin
(74) *Attorney, Agent, or Firm*—Xin Wen

(57) ABSTRACT

An optical module includes a transmitter optical sub-assembly comprising a transmitter configured to emit a multi-longitudinal-mode (MLM) spectrum signal having an emission spectrum comprising a plurality of distinct narrow-spectrum peaks each corresponding to a longitudinal mode in the transmitter. The emission spectrum can be shifted in wavelength by a change in the transmitter temperature. The optical module also includes a heating and cooling device configured to control the temperature of the transmitter in response to a temperature-control signal and a receiver optical sub-assembly configured to output a pair of differential digital signals in response to an input optical signal.

20 Claims, 16 Drawing Sheets

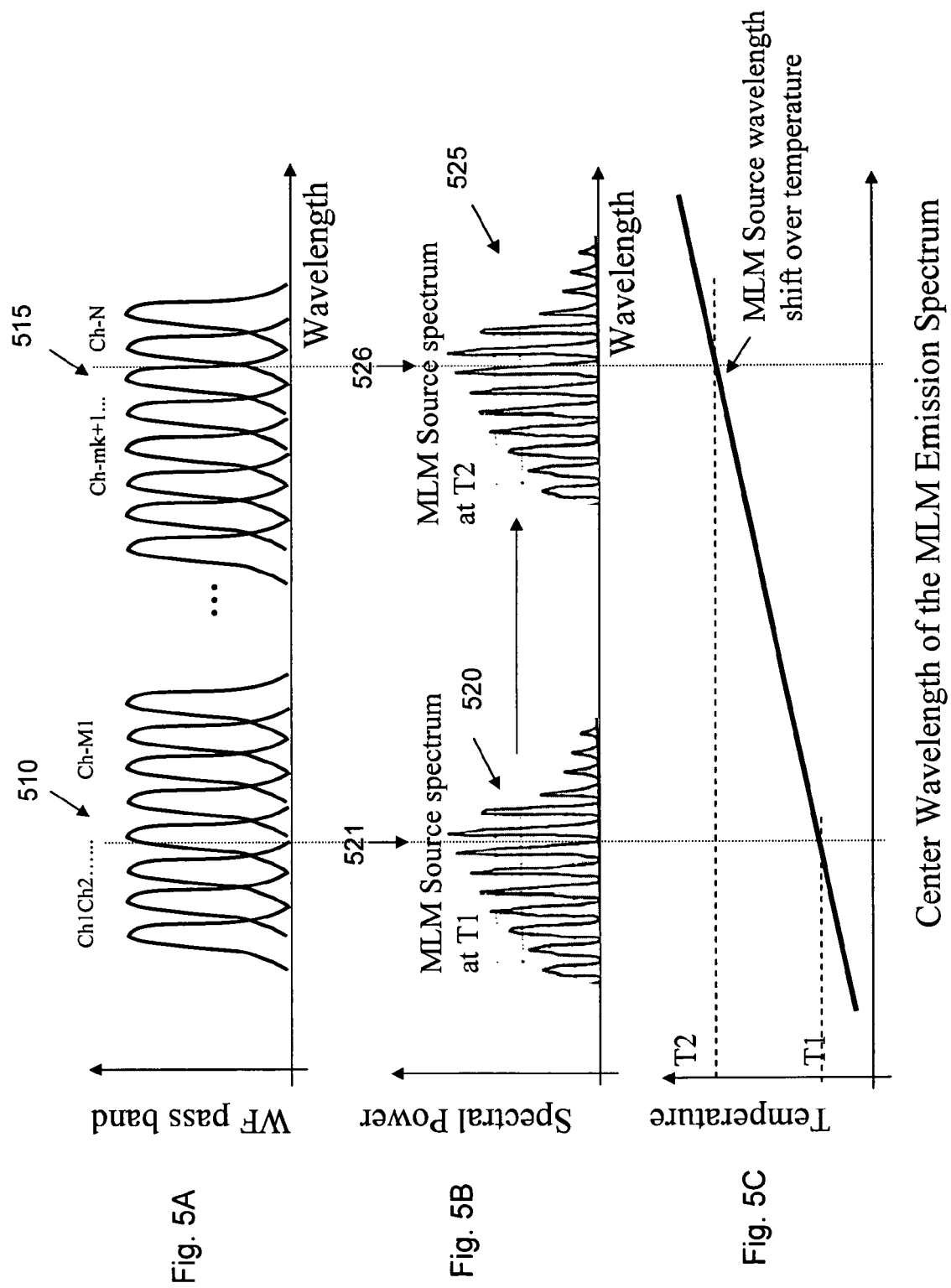

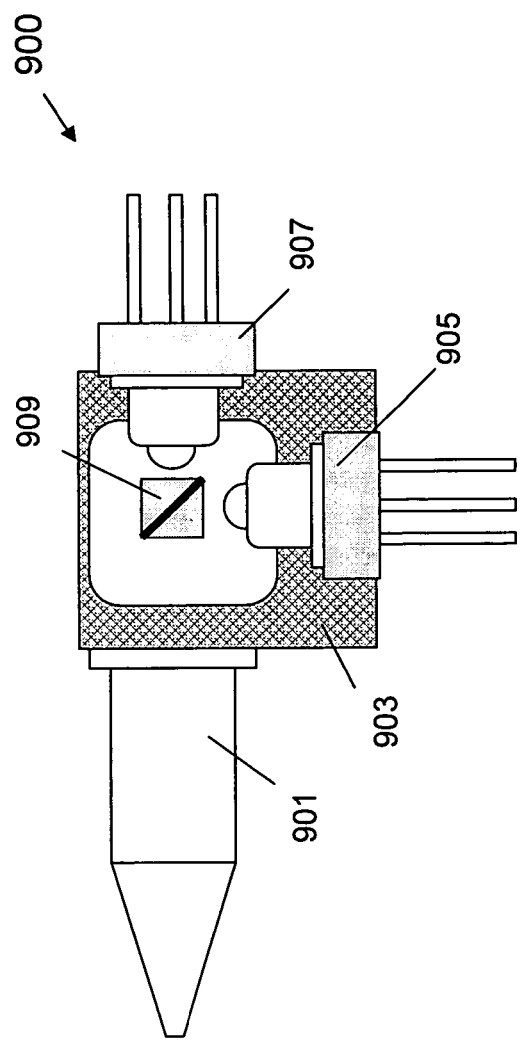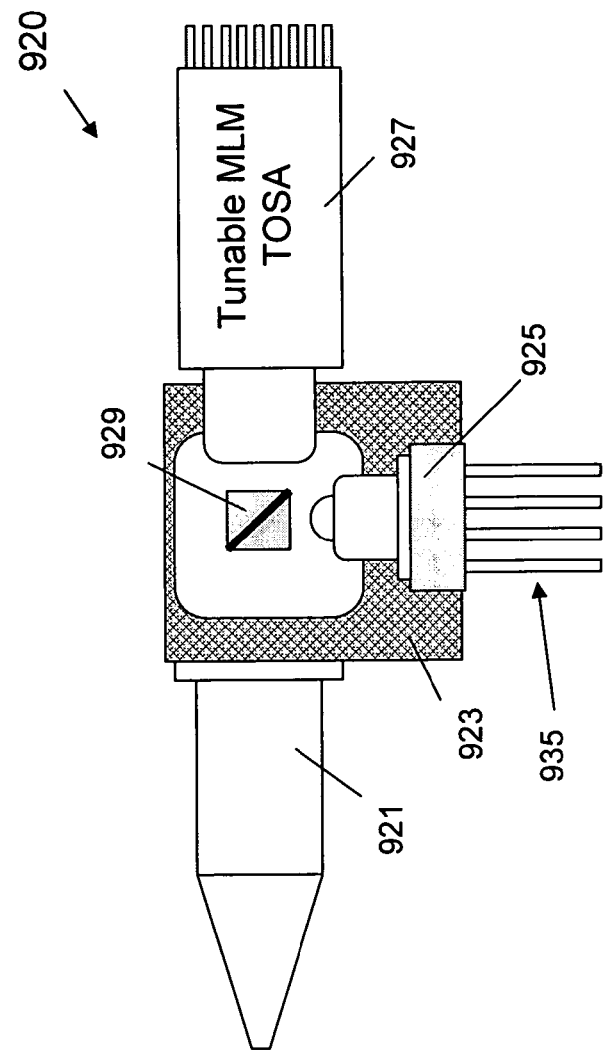
Figure 9A
Figure 9B

ADAPTIVE OPTICAL TRANSCEIVER FOR FIBER ACCESS COMMUNICATIONS

CROSS REFERENCES TO RELATED APPLICATIONS

This application is related to commonly assigned U.S. patent application Ser. No. 11/396,973, titled "Fiber-to-the-premise optical communication system" by Li et al, filed Apr. 3, 2006, and U.S. patent application Ser. No. 11/413,405, titled "High speed fiber-to-the-premise optical communication system" by Li et al, filed Apr. 28, 2006. The content of these disclosures is incorporated herein by reference.

BACKGROUND

The present disclosure relates to optical communication technologies.

As the Internet, voice over Internet Protocol (VoIP), and Internet Protocol television (IPTV) grow in popularity, more and more users desire to have accesses to these services from their premises. The most common local network accesses to these services are the digital subscriber line (DSL) and the cable modem. The DSL and cable networks respectively operate on a pair of copper wires or coaxial cable. While the DSL and the cable modem allow data transfer at up to several million bits per second downstream to a user, the upstream data transfer is usually at lower transfer rate.

Passive optical network (PON) is attractive network architecture for the last-mile access because it does not require active components for directing optical signals between a central office and the network subscribers' terminal equipment. The PON can be divided into three main categories: time division multiplexing (TDM), wavelength division multiplexing (WDM), and a combination of TDM and WDM.

Fiber to the premises (FTTP) is a desirable architecture for providing access from the users' premises. FTTP takes optical fibers all the way into the users' homes or premises. Currently, time-division-multiplexing passive optical networks (TDM-PON) are the primary deployment methods for FTTP. TDM-PON is a point-to-multipoint architecture utilizing an optical power splitter at a remote node. TDM-PON delivers downstream information through broadcasting and bandwidth sharing, and receives upstream information via time division multiple access (TDMA). One drawback with TDM-PON is associated with the low security of the broadcasted downstream signals. The complexity of the TDMA protocols also makes TDM-PON undesirable for the next generation user-centric high-speed, broadband services.

A recent development in the FTTP is PON based on wavelength division multiplexing (WDM) technology. FIG. 1 illustrates a conventional WDM-based optical network 100 that includes a pair of WDM filters 108 and 116 for multiplexing and de-multiplexing between an optical line terminal (OLT) 102 and an optical network unit (ONU) 104. The WDM filters 108 and 116 are connected by a feeder fiber 101. The optical line terminal (OLT) 102 can be coupled to a plurality of optical network units (ONUs) 104 via a remote node 106. Each subscriber at an ONU 104 is assigned a separate WDM channel, whereby the channels are routed by a passive WDM filter at the remote node 106. The OLT 102 includes a WDM filter 108 coupled to a plurality of band separators 110-1 ... 110-N. Each band separator 110-1 ... 110-N is further coupled to a transmitter 112-1, 112-2 ... or 112-N and a receiver 114-1, 114-2 ... or 114-N.

The passive WDM filter 116 at the remote node 106 provides a plurality of channels that each channel terminates at one of the ONU 104. Each ONU 104 includes a band separator 118-1 ... 118-N each coupled to a transmitter 120-1, 120-2 ... or 120-N and a receiver 122-1, 122-2 ... or 122-N. The transmitters 120-1 ... 120-N at the ONUs 104 provide narrow-spectrum light sources for upstream signals in a band A. The transmitters 112-1 ... 112-N at the OLT 102 provide narrow-spectrum light source for the downstream signals in a different wavelength band B. The transmitters 120-1 ... 120-N and 112-1 ... 112-N are typically narrow-spectrum distributed-feedback (DFB) laser diodes with various wavelength tuning and stabilization mechanisms.

The above described conventional WDM-based optical network includes several drawbacks. The wavelength-specific narrow-spectrum light sources such as distributed-feedback (DFB) laser diodes are complex to make and have limited range of wavelength tunability by adjusting the laser operating temperature. The ONU for each subscriber uses at least one such laser. A large number of the wavelength-specific narrow-spectrum light sources are thus required in the conventional WDM-based optical network 100, which typically contains 32 or 40 ONUs. All the DFB laser chips have to be customer designed to the specific wavelength range for each group of a few wavelength channels. The emission center wavelengths of the DFB laser sources typically need to be fine tuned individually by temperature controller using precision spectral instrument to match the ITU wavelength grid of each wavelength channel. The inventory and field installation can become very complex and unmanageable in large-scale deployment for access.

Furthermore, the shift in the narrow spectrum of a wavelength-controlled DFB laser diode relative to the narrow wavelength channels of the DWDM wavelength filter can significantly affect the signal transmission. For example, a fraction of a degree of temperature drift can drive the emission spectrum of a narrow-spectrum laser out of the clear pass band window of the wavelength channel and cause significant loss of transmission signal. The reliability of the precision-temperature-controlled narrow-spectrum lasers is therefore a challenge in WDM-PON applications.

SUMMARY

In a general aspect, the present specification relates to an optical module including a transmitter optical sub-assembly comprising a transmitter configured to emit an multi-longitudinal-mode (MLM) spectrum signal having an emission spectrum comprising a plurality of distinct narrow-spectrum peaks each corresponding to a longitudinal mode in the transmitter, wherein the emission spectrum is configured to be shifted in wavelength by a change in the transmitter temperature; a heating and cooling device configured to control the temperature of the transmitter in response to a temperature-control signal; and a receiver optical sub-assembly configured to output a pair of differential digital signals in response to an input optical signal.

In another general aspect, the present specification relates to an optical transceiver module including a transmitter configured to emit a multi-longitudinal-mode (MLM) spectrum signal having an emission spectrum comprising a plurality of distinct narrow-spectrum peaks each corresponding to a longitudinal mode in the transmitter, wherein the emission spectrum is configured to be shifted in wavelength by changing the temperature of the transmitter; a temperature sensor in thermal contact with the transmitter, wherein the temperature sensor is configured to output a temperature sensing signal in response to the temperature of the transmitter; a temperature controller configured to control the temperature of the transmitter in response to a temperature-control signal; and a receiver configured to receive an input optical signal and output a pair of differential digital signals, and configured to output an analog monitoring signal in response to the power of the input optical signal.

In yet another general aspect, the present specification relates to an optical communication system including a) a plurality of first optical transceiver modules each including a first transmitter configured to emit a downstream multi-longitudinal-mode (MLM) spectrum signal having an emission spectrum comprising a plurality of distinct narrow-spectrum peaks each corresponding to a longitudinal mode in the first transmitter, wherein the emission spectrum of the downstream multi-longitudinal-mode (MLM) spectrum signal is configured to be shifted in wavelength by changing the temperature of the first transmitter; a first temperature controller configured to control the temperature of the first transmitter in response to a first temperature-control signal; and a first receiver configured to output a pair of differential digital signals in response to the upstream optical signal; and b) a first wavelength filter including a plurality of first branching ports each associated with a specific wavelength channel, wherein each of the first branching ports is in connection with a first optical transceiver modules and is configured to receive the downstream MLM-spectrum signal from the first transmitter and send an upstream signal to the first receiver; and a first common port configured to output a downstream signal in response to the downstream MLM-spectrum signal, wherein the spectrum of the downstream signal is located in a wavelength channel specifically associated with the first branching port at which the downstream MLM-spectrum signal is received.

In yet another general aspect, the present specification relates to an optical communication system including a) a first optical transceiver module that includes: a first transmitter configured to emit a downstream optical signal having a first emission spectrum that is configured to be shifted in wavelength by a change in the temperature of the first transmitter; a first temperature controller configured to control the temperature of the first transmitter in response to a first temperature-control signal; and a first receiver configured to output a first digital signal in response to an upstream optical signal; and b) a second optical transceiver module that includes: a second transmitter configured to emit the upstream optical signal having a second emission spectrum that is configured to be shifted in wavelength by a change in the temperature of the second transmitter; a second temperature controller configured to control the temperature of the second transmitter in response to a second temperature-control signal; and a second receiver configured to output a second digital signal in response to the downstream optical signal.

Implementations of the system may include one or more of the following. The transmitter optical sub-assembly, the heating and cooling device, and the receiver optical sub-assembly can be integrated in a unitary device. The optical module can further include a wavelength division multiplexing filter configured to receive the input optical signal at an input/output port and send the input optical signal to the receiver, and configured to receive the MLM spectrum signal from the transmitter and output the MLM spectrum signal at the input/output port. The optical module can be a unitary device in which the transmitter optical sub-assembly, the heating and cooling device, the wavelength division multiplexing filter, and the receiver optical sub-assembly are integrated. The optical module can further include a temperature sensor in thermal contact with the transmitter, wherein the temperature sensor is configured to output the temperature control signal to the heating and cooling device in response to the temperature of the transmitter. The heating and cooling device can be configured to control the temperature of the transmitter in response to an external signal. The receiver optical sub-assembly can be configured to an analog monitoring signal in response to the power of the input optical signal. The transmitter can be a Fabry-Perot laser. The emission spectrum of the MLM spectrum source can be characterized by a center wavelength, wherein the center wavelength is configured to be shifted by more than 0.4 nm for a change of one Celsius degree in the temperature of the transmitter.

Embodiments may include one or more of the following advantages. The disclosed optical transceiver module allows an optical communication system to include only passive devices between the central office and the user's premises. As a result, the complexity and maintenance associated with the disclosed optical communication system can be significantly reduced comparing to some conventional systems that use active devices in the field. The use of passive devices in the fields also improves the system reliability of the optical communication system.

The transmitter optical sub-assembly (TOSA) in the disclosed transceiver module overcomes the drawbacks associated with the wavelength-specific narrow-spectrum light sources in the conventional systems. The disclosed optical communication system uses temperature-stabilized multi-longitudinal mode (MLM) light sources such as Fabry-Perot lasers as optical transmitters. The MLM sources have much broader emission envelops than that of the narrow-spectrum light sources (i.e. DFB lasers) in the conventional DWDM based optical communication systems. The MLM light sources also have wider wavelength tuning range with temperature comparing to the narrow-spectrum DFB sources. The broad emission envelope and a wide wavelength tunable range of the MLM light source allows the same specification transmitters to be used for 32, 40, or even more of the wavelength channels of a typical 100 GHz-spacing wavelength filter, which eliminates the needs for maintaining a large inventory of wavelength-specific transmitters.

The disclosed optical transceiver module based on an MLM light source also exhibits robust performance. The active feedback and control mechanism built into the transceiver module enable reliable operations in the communication system. Small temperature variations that can cause certain MLM modes to move out of the pass band of a wavelength channel can be immediately detected by the system and instantaneously compensated through the control mechanism.

Furthermore, the optical transceiver module including a MLM light source in the disclosed optical communication system can be self-adaptive through built-in control capabilities. The broad emission envelope of the MLM light sources in the disclosed optical communication system can be shifted by adjusting the temperature of the MLM light sources. Such temperature control and wavelength tuning can be automatically carried out in the system interactively or dynamically prior to or during the normal operation. The transmitter having built-in self-adaptive feature is critical for large scale deployment especially with vast number of ONU's in the field. The disclosed transceiver module can provide real-time feedback about the status of the communication channel, to improve the performance of the optical communication system. The disclosed system based on MLM sources can achieve high speed of data transmission under outdoor uncontrolled environment. For example, the disclosed optical communication system can achieve data rate of several Gigabits per second (Gbps) per ONU, which is an order of magnitude higher than other TDM-based PON systems. The disclosed system can provide bandwidth capacity, system stability, and robustness unmatched by conventional WDM-PON systems based on other types of transmitter configurations, for example, injection-locked laser or reflective semiconductor optical amplifier.

The receiver optical sub-assembly (ROSA) in the disclosed optical transceiver module can be implemented with dual functionalities of digital signal detect and optical channel monitor. Such implementation removes the requirements for additional optical tap monitor specifically for power monitoring purpose, which could significantly reduce the system cost.

Another advantage of the disclosed optical communication system is that it provides flexibility for network configuration, integration, and management. The disclosed optical communication system is agnostic to different communication protocols. Unlike conventional TDM-PON systems that need extra protocols (TDMA, RANGING) between optical layer and data layer, the signal transmission between the OLT and ONU in the disclosed optical communication system operates in a continuous mode and each ONU occupies a dedicated channel. The system can naturally adapt to any communication protocols at any bit-rate.

Yet another advantage of the disclosed optical communication system is that each ONU can communicate in an independent channel. The bandwidth capacity for each ONU can be upgraded without changing the overall optical communication system and at minimal incremental cost, which greatly extends the lifetime of the installed devices and components. In contrast, the downstream and upstream bandwidths are shared by all users in a conventional PON (or TDM-PON) system. Any bandwidth increase for one user will affect the resource allocation and the operation of the entire system. The conventional PON (or TDM-PON) is thus not scalable and extremely bit-rate and protocol dependent. Thus the disclosed optical communication system can provide much improved bandwidth scalability, upgrade flexibility and performance robustness.

Each ONU in the disclosed system occupies a unique wavelength channel. The channel spacing can be anywhere from a few hundred picometers (in the case of DWDM) to tens of nanometers (in the case of CWDM). Dispersion and optical non-linear effects usually have less impact on signal quality because of the short distance in the access applications. Because of the cyclic characteristic of the wavelength filter (AWG), hundreds of wavelength channels can potentially be used for network expansion. In addition, each wavelength channel can operate independently in continuous mode. The bandwidth for each ONU can be upgraded from 100 Mbps to 1 Gbps, 2.5 Gbps, or even higher. The total throughput of one WDM-PON can be as high as 40~100 Gbps, which provides much needed bandwidth for future expansions.

The disclosed optical communication system includes a number of other advantages. The disclosed optical communication system can provide symmetrical bandwidths for downstream and upstream signals. The bandwidth symmetry allows high bit-rate data transfers both downstream and upstream directions, which is a significant improvement over TDM-PONs (APON, BPON, EPON and GPON) and the conventional systems based on DSL and cable modems. The disclosed optical communication system also provides excellent network security and communication privacy because each ONU occupies a distinct wavelength channel and is physically isolated from other wavelength channels at optical layer.

Although the specification has been particularly shown and described with reference to multiple embodiments, it will be understood by persons skilled in the relevant art that various changes in form and details can be made therein without departing from the spirit and scope of the specification.

BRIEF DESCRIPTION OF THE DRAWINGS

The following drawings, which are incorporated in and from a part of the specification, illustrate embodiments of the present specification and, together with the description, serve to explain the principles of the specification.

FIG. 5A illustrates the spectral distribution of the wavelength channels of the wavelength filters.

FIG. 5B illustrates the spectrum of a MLM source at two different temperatures $T_1$ and $T_2$.

FIG. 5C illustrates the temperature dependence of the center wavelength of a typical MLM source.

FIG. 9A illustrates the construction of a conventional bi-directional optical sub-assembly in a low cost transistor outline can (TO-CAN) package.

FIG. 9B illustrates a bi-directional optical sub-assembly having a tunable MLM TOSA in accordance with an embodiment of the present specification.

DETAILED DESCRIPTION

Figure 1:
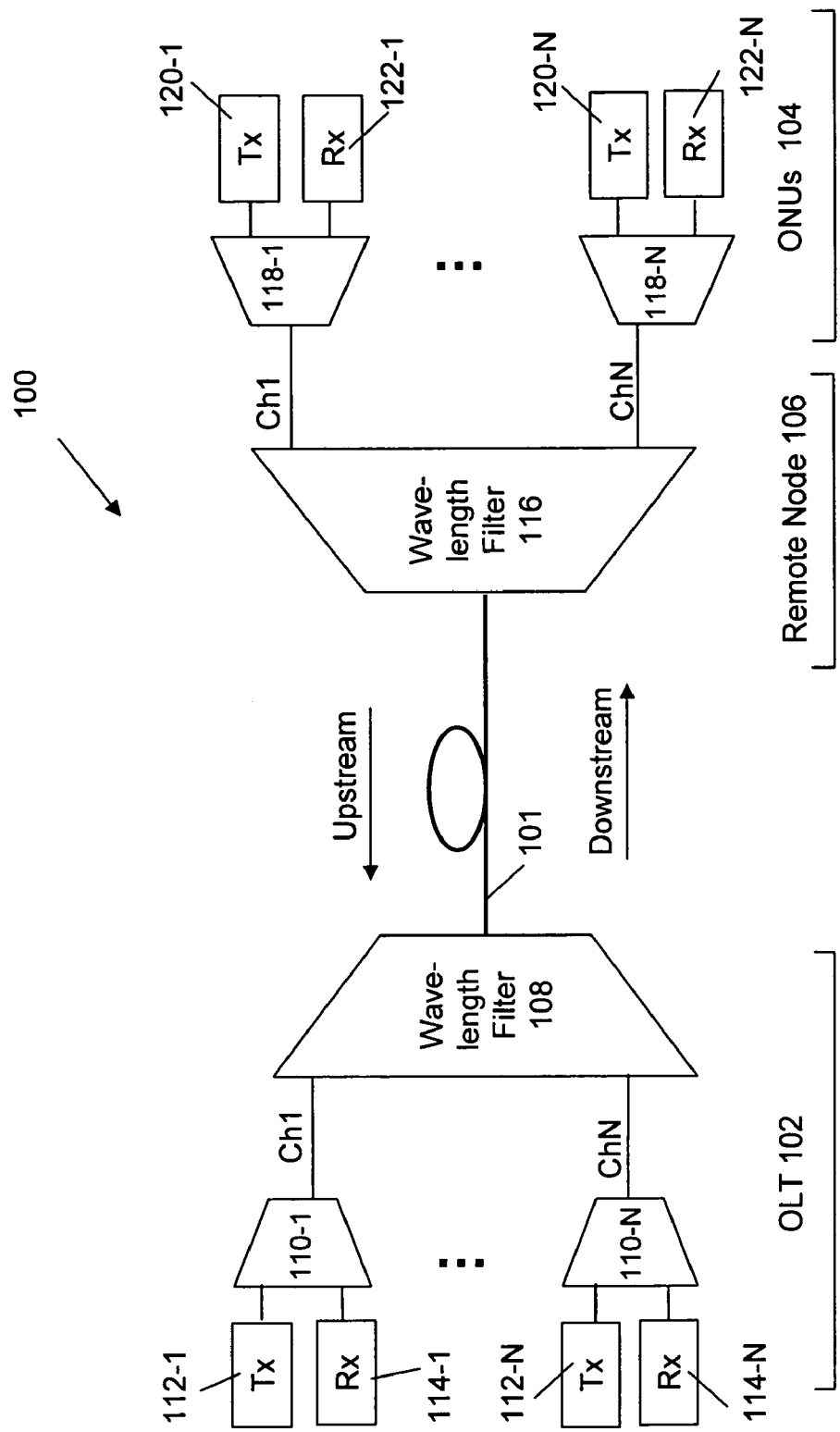
FIG. 1 is a block diagram of a conventional WDM-based optical network.
Figure 2A:
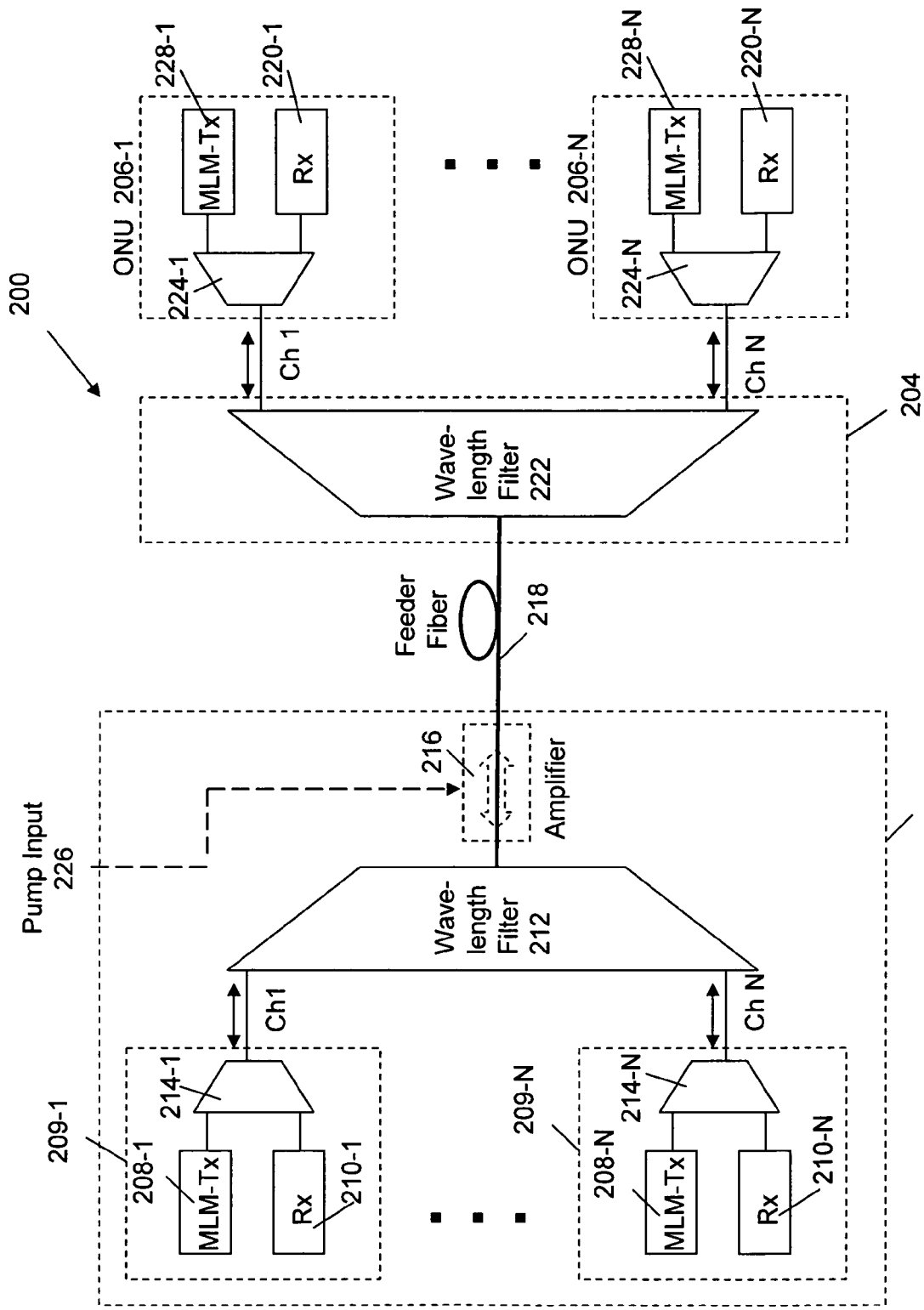
FIG. 2A is a block diagram of an optical communication system using MLM sources as transmitters in accordance to an embodiment of the present specification.

FIG. 2A shows an optical communication system 200 in accordance with an embodiment of the present specification. The optical communication system 200 includes an OLT 202, a remote node (RN) 204 in connection with the OLT 202 through an optical network, and a plurality of ONUs 206-1 . . . 206N in connection with the RN 204.

The optical communication system 200 includes two symmetric wavelength filters: a wavelength filter 212 in the OLT 202 and a wavelength filter 222 at the RN 204. The wavelength filter 212 and the wavelength filter 222 are wavelength division multiplexing (WDM) filters. The wavelength filters 212 and 222 can be implemented by arrayed-waveguide gratings (AWG) that can be tuned to the common communication bands, including O, E, S, C, L or U-band and typically follow the wavelength grids of International Telecommunication Union (ITU). The wavelength filters 212 or 222 can also be based on other forms of WDM filters such as thin-film DWDM and CWDM filters.

Figure 2B:
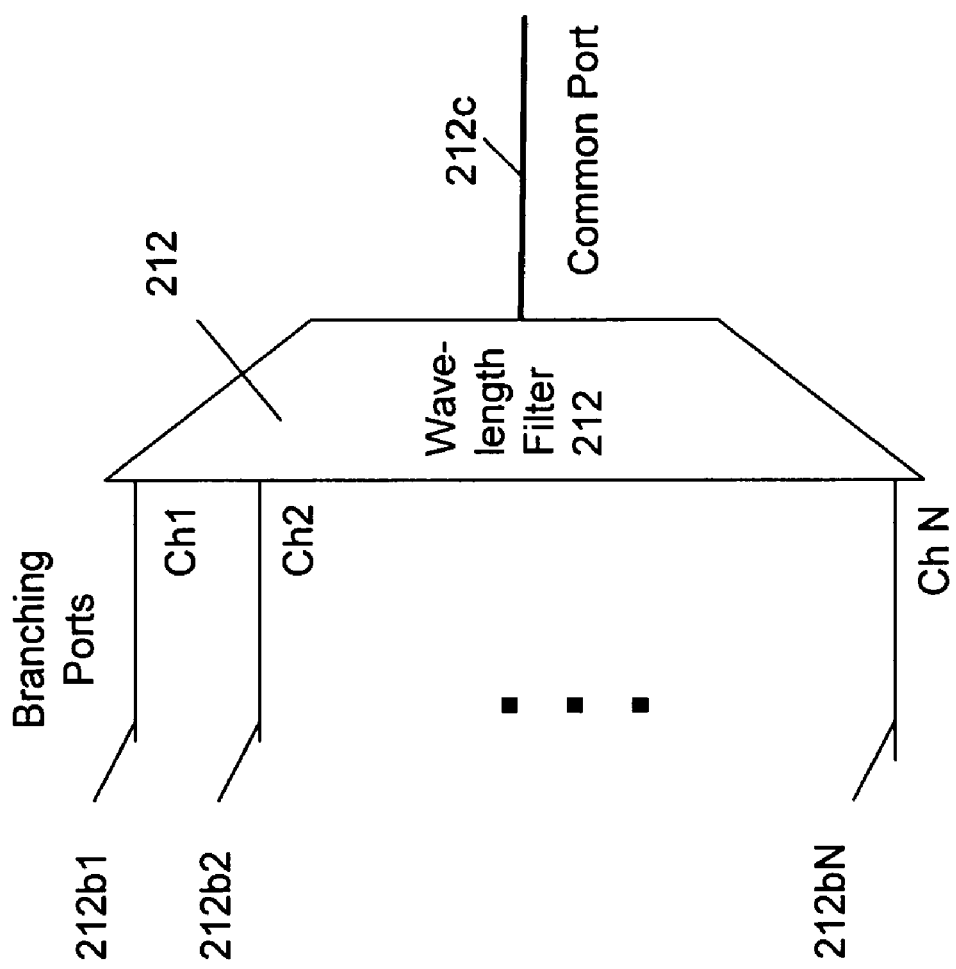
FIG. 2B is a detailed view of the wavelength filter in the optical line terminal in the optical communication system of FIG. 2A.
Figure 2C:
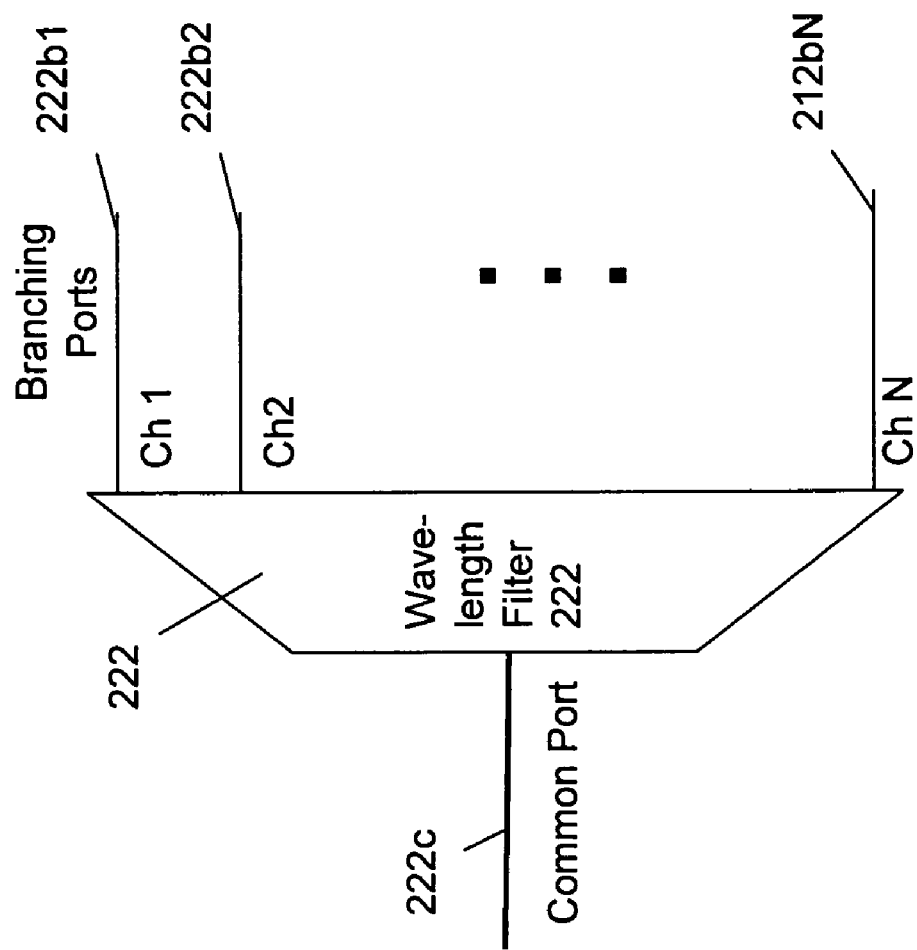
FIG. 2C is a detailed view of the wavelength filter at the remote node in the optical communication system of FIG. 2A.

The wavelength filter 212 or 222 can receive MLM source signals at separate branching ports (i.e. 212$b$1, 212$b$2 . . . 212$b$N and 222$b$1, 222$b$2 . . . 222$b$N as shown FIGS. 2B and 2C) as inputs and filter (or slice) the MLM source signals to output multiplexed spectrum-sliced signals at the common ports (i.e. 212$c$, and 222$c$ in FIGS. 2B and 2C) of the wavelength filter 212 or 222. Each of the spectrum-sliced signals carries data from the respective input MLM source signals. The output spectrum-sliced signals are respectively located in a plurality of predetermined wavelength channels "Ch1", "Ch2" . . . "Ch N" identical to both wavelength filters 212 and 222. The wavelength channels "Ch1", "Ch2" . . . "Ch N" are determined by the pass bands of the wavelength filters 212 and 222, and characterized by the unique channel center wavelengths ($\lambda_{Ch1}$, $\lambda_{Ch2}$ . . . $\lambda_{ChN}$), the pass band width and the optical isolation between each wavelength channel. The adjacent channel spacing ($|\lambda_{Chi} - \lambda_{Chi-1}|$, i=2, 3 . . . N) between the wavelength channels "Ch1", "Ch2" . . . "Ch N" of the filters 212 or 222 can range from hundreds of picometer to tens of nanometer.

A detailed view of the wavelength filter 212 in the OLT 202 is shown in FIG. 2B. The wavelength filter 212 includes a plurality of branching ports 212$b$1, 212$b$2 . . . and 212$b$N, and a common port 212$c$. Each of the branching ports 212$b$1, 212$b$2 . . . or 212$b$N is associated with a distinct and specific wavelength channel "Ch1", "Ch2" . . . or "Ch N". The wavelength filter 212 can receive a downstream MLM source signal at a branching ports 212$b$1, 212$b$2 . . . or 212$b$N, and filter (or slice) the spectrum of the downstream MLM source signal. The wavelength filter 212 then outputs a downstream spectrum-sliced signal at the common port 212$c$. The spectrum of the downstream spectrum-sliced signal is located in the specific wavelength channel associated with the branching port 212$b$1, 212$b$2 . . . or 212$b$N at which the downstream MLM source signal is received. In other words, the spectrum of the downstream spectrum-sliced signal output at the common port 212$c$ is determined by the wavelength channel associated with the branching port 212$b$1, 212$b$2 . . . or 212$b$N at which the input downstream broad-spectrum signal is received.

The wavelength filter 212 can also process optical signals in the reverse direction. An upstream spectrum-sliced signal (received from the wavelength filter 222 via the feeder fiber 218 and the optional optical amplifier 216) can be received at the common port 212$c$. The upstream spectrum-sliced signal is characterized by a spectrum in a specific wavelength channel "Ch1" or "Ch2" . . . "ChN". The wavelength filter 212 can route the upstream spectrum-sliced signal to one of the branching ports 212$b$1, 212$b$2 . . . or 212$b$N in accordance with the wavelength channel of the upstream spectrum-sliced signal. The routing is so arranged that the wavelength channel of the upstream spectrum-sliced signal matches the wavelength channel of the receiving branching port 212$b$1, 212$b$2 . . . or 212$b$N. The upstream spectrum-sliced signal routed to a branching port 212$b$1, 212$b$2 . . . or 212$b$N is subsequently transmitted to one of the transceiver ports 209-1, 209-2, or 209-N.

The central wavelength of wavelength filters can be sensitive to temperature variations. In one implementation, the wavelength filters 212 or 222 can be based on athermal AWGs, which become commercially available recently. The athermal AWGs can include various temperature compensation mechanisms to reduce the sensitiveness of the AWG-based wavelength filters 212 and 222 to temperature variations and to allow them be installed in an environment without temperature control. This capability of the disclosed optical communication system can significantly reduce the complexity and cost for field installations.

The optical communication system 200 further includes a plurality of transceiver ports 209-1, 209-2 . . . 209-N that can reside in the OLT 202. Each transceiver port 209-1, 209-2 . . . 209-N can include a transmitter 208-1 (or 208-2 . . . 208-N) for providing MLM downstream optical signals and a receiver 210-1 (or 210-2 . . . 210-N) for receiving upstream optical signals. Connecting the transmitter and the receiver is a signal separating/combining device 214-1 (or 214-2 . . . 214-N).

In one embodiment, the transceiver port 209-1, 209-2 . . . 209-N can be based on the various implementations of the integrated optical transceiver modules as disclosed below in FIGS. 6-10. Specifically, the transceiver port 209-1, 209-2 . . . 209-N can be bi-directional integrated optical transceiver modules that can receive upstream signals and output down steam MLM-source signals at a single optical connector. The integrated optical transceiver modules can include temperature control and sensing capabilities for the MLM-source transmitters 208-1 . . . 208-N. The integrated optical transceiver modules can also provide output signals that represent the power levels of the MLM-source transmitters 208-1 . . . 208-N.

Each transceiver port 209-1, 209-2, . . . 209-N is connected with one of the branching ports 212$b$1, 212$b$2 . . . 212$b$N of the wavelength filter 212 and is thus associated with a specific wavelength channel "Ch1", "Ch2" . . . "Ch N" of the wavelength filter 212. The wavelength filter 212 can be coupled with the transceiver ports 209-1, 209-2 . . . 209-N by single-mode optical fibers. The MLM signals produced by the transmitters 208-1, 208-2, . . . 208-N are sliced by the wavelength filter 212 to produce multiplexed spectrum-sliced signals each occupying a wavelength channel specific to the respective branching port 212$b$1, 212$b$2 . . . or 212$b$N of filter 212. The receivers 210-1, 210-2 . . . 210-N are configured to receive spectrum-sliced signals having their wavelength channels specific to the respective branching ports 212$b$1, 212$b$2 . . . and 212$b$N of the wavelength filter 212.

The optical system 200 has a symmetrical architecture, which also includes a plurality of transceiver ports 206-1, 206-2 . . . 206-N in each ONU distributed in the field. Each transceiver port 206-1, 206-2 . . . 206-N contains a transmitter 228-1 (or 228-2 . . . 228-N) for providing MLM upstream optical signal and a receiver 220-1 (or 220-2 . . . 220-N) for receiving MLM downstream optical signals.

Connecting the transmitter and the receiver is a signal separating/combining device 224-1 (or 224-2 ... 224-N).

In the present specification, the term "downstream signal" refers to an optical signal sent from service provider's central office to users' premises. The term "upstream signal" refers to an optical signal sent from the users' premises to a central office. The term "MLM source" or "multi-longitudinal mode source" refers to an optical signal that has a spectrum with composite of peaks (modes) wherein the envelope joining the modal peaks having a full-width at half the maximum (FWHM) equal to or greater than 1 nanometer. A "narrow spectrum" refers to an optical signal that has a spectral FWHM of the line profile less than 1 nanometer and also its side modes are suppressed by a minimum of 10 dB. A spectrum-sliced signal refers to the signal sliced (or filtered) from a "MLM source" unless it is otherwise specified. Thus the spectral FWHM of a spectrum-sliced signal is a fraction of the spectral envelope FWHM of the original "MLM source" signal.

The transmitters 208-1, 208-2 ... 208-N and 228-1, 228-2 ... 228-N can be based on MLM sources that can be directly modulated to carry the downstream optical signals. One example for the MLM source transmitter is multi-longitudinal mode Fabry-Perot lasers. The transmitters 208-1, 208-2 ... 208-N and 228-1, 228-2 ... 228-N can also be implemented by temperature controlled super luminescent diodes (SLD) and its variant. Fabry-Perot lasers are less costly and much easier to maintain compared to the wavelength-specific narrow-spectrum transmitters (such as DFB lasers) in the conventional optical systems. The MLM transmitters 208-1, 208-2 ... 208-N and 228-1, 228-2 ... 228-N, the receivers 210-1 ... 210-N and 220-1, 220-2 ... 220-N and the signal separating/combining devices 214-1, 214-2 ... 214-N and 224-1, 224-2 ... 224-N can be integrated to a unitary device for bi-directional signal transmission (discussed below in FIGS. 6-8), which can reduce form-factor and costs.

The transmitters 208-1 ... 208-N and 228-1 ... 228-N can be modulated at rates ranging from hundreds to thousands of megabit per second (Mbps) modulation speed. The transmitters 208-1 ... 208-N and 228-1 ... 228-N can provide stable MLM light sources with minimal or no instabilities caused by external optical feedback or back-reflection. In certain applications, special measures may be required to reduce any instability that might be induced by reflection or backscattering. The center wavelengths (CW) of the common MLM source signals can be designed anywhere in the optical spectrum of the communication window for the common optical fibers, which can be from 1100 nm to 1700 nm.

Figure 3A:
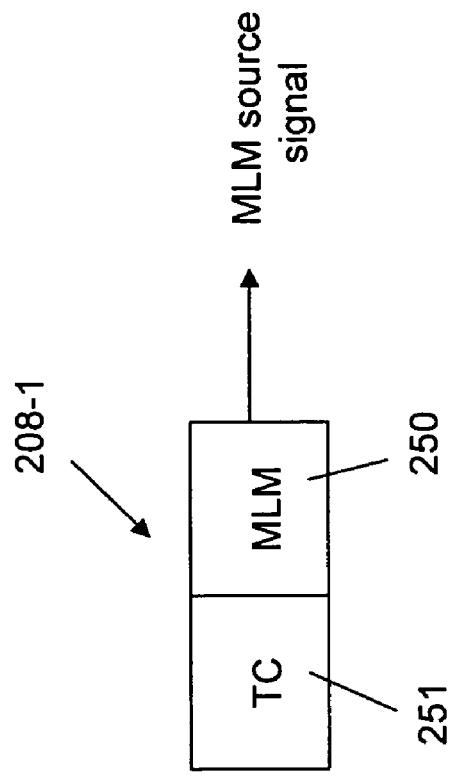
FIGS. 3A and 3B respectively illustrate exemplified implementations of the MLM transmitters in an OLT and an ONU.

An advantage of the use of MLM source in the optical communication system 200 is that the transmitter 208-1 ... 208-N or 228-1 ... 228-N can be easily tuned and locked at a specified center wavelength. The optical communication system 200 can cover a large number of individual wavelength channels. The center wavelength of each MLM source can be stabilized by a temperature controller. As shown in FIG. 3A, the transmitter 208-1 in the OLT 202 can include a multi-longitudinal mode source (MLM) 250 and a temperature controller 251. MLM 250 is in thermal contact with the temperature controller 251. The temperature controller 251 can be thermal electric temperature controller built-in the MLM source 208-1.

The broad envelope of the emission spectrum combining the fine pith of mode-spacing of the MLM source could relax the temperature control requirements for MLM source comparing to those of the DFB lasers. The DFB lasers typically require temperature control to achieve wavelength accuracy within 0.1 nanometer and to guard against long-term aging of the laser and the temperature control system. The MLM source in the disclosed system can be more tolerant. In some implementations, the MLM sources suitable for the transmitters 208-1 ... 208-N and the transmitters 228-1 ... 228-N can accept wavelength accuracy >0.1 nanometer and the transceiver system could have the capabilities to correct transient or aging related drifts with the built-in feedback/control systems described in details below. The temperature controller 251 (and 261) can be implemented by standard, low-cost controller devices. As discussed in more detail below, the wavelength tuning and control of the MLM sources can be fully automatic. The emission spectra for transmitters 208-1 ... 208-N and the transmitter 228-1 ... 228-N can be controlled by simply setting the control temperature to their corresponding set points, which could be sufficient to cover all the wavelength channels of the wavelength filters 212 and 222.

In one embodiment, the ONUs 206-1 ... 206-N can be based on the various implementations of the integrated optical transceiver modules as disclosed below in FIGS. 6-10. Specifically, the ONUs 206-1 ... 206-N can be bi-directional integrated optical transceiver modules that include temperature control and sensing capabilities for the MLM-source transmitters 228-1 ... 228-N. The integrated optical transceiver modules can also provide output signals that represent the power levels of the MLM-source transmitters 228-1 ... 228-N.

The wavelength filter 212 can receive the MLM source optical signals produced by the transmitter 208-1 ... 208-N and filter (or slice) the MLM source optical signals to produce multiplexed spectrum-sliced optical signals at the common port 212c. The spectrum of each MLM source optical signal is tuned specifically to be associated with the branching port 212b1, 212b2 ... and 212bN of the wavelength filter Ch1 ... ChN to which the MLM source signal is transmitted.

The wavelength filters 212 and 222 based on AWGs can be cyclic over a wavelength range. The pass band for a spectrum-slicing channel (Ch1, Ch2 ... and ChN) can be cyclic in the optical spectrum. Each channel (Ch1, Ch2 ...) can have multiple pass-band peaks separated by a free spectral range (FSR). The periodicity or free spectral range can be varied by design. Furthermore, the FSR may be designed to be close to the overall AWG pass band width (defined by the wavelength span between the center wavelengths of the first and the last filter channel within the same FSR: $|\lambda_{ChN} - \lambda_{Ch1}|$).

One advantage of the AWG based filters 212 or 222 is that the downstream and upstream traffics can be separated by a wavelength of one or more FSRs for each channel ("Ch1", "Ch2" ... "Ch N"). For example, a bidirectional system can be implemented such that the downstream signals occupy a sequence of center wavelengths—$\lambda_{Ch1}, \lambda_{Ch2} \ldots \lambda_{ChN}$ in C band while upstream signals occupy a sequence of center wavelengths—$(\lambda_{Ch1}+n\times FSR), (\lambda_{Ch2}+n\times FSR) \ldots (\lambda_{ChN}+n\times FSR)$, where n=0 or +/−1 or +/−2 ... possibly in a different band.

Each transceiver port 209-1 ... 209-N can include a signal separating/combining device 214-1 ... 214-N to assist bi-directional communications in either downstream or upstream directions. These signal separating/combining devices 214-1 ... 214-N can be implemented by WDM filters, power splitter, and circulators. The signal separating/combining devices 214-1 ... 214-N are respectively coupled with the transmitter 208-1 . . . 208-N and the receivers 210-1 . . . 210-N in the respective transceiver ports 209-1 . . . 209-N. The signal separating/combining devices 214-1 . . . 214-N are also coupled with the wavelength filters 212, each of which can include a single optical fiber connection. In the implementation of WDM filters combining with AWG as wavelength filter, the signal separating/combining devices 214-1 . . . 214-N can use filter function to separate signal in different regions of the FSR for the downstream optical signals from the transmitter 208-1 . . . 208-N and the upstream optical signals to be received by the receivers 210-1 . . . 210-N. Thus the signal separating/combining devices 214-1 . . . 214-N can enable bi-directional transmission of optical signals with a single optical connection to the wavelength filter 212. The temperature-controlled MLM source 208-1, 208-2 . . . 208-N, the receiver photodiode 210-1, 210-2 . . . 210-N and the WDM filter based signal separating/combining device 214-1, 214-2 . . . 214-N can be integrated into a unitary bi-directional optical sub-assembly (OSA), which is to be discussed in detail in connection with FIGS. 6-10.

The wavelength filter 222, typically mirroring that of the filter 212 in optical specifications, is optically connected with the plurality of ONUs 206-1 . . . 206-N. Each of the ONUs 206-1 . . . 206-N is specifically associated with a counterpart transceiver port 209-1 . . . 209-N in the OLT 202 and is characterized by a specific wavelength channel determined by the filter function of the filters 212 and 222. Each wavelength channel can carry bidirectional signals.

A detailed view of the wavelength filter 222 in the RN 204 is shown in FIG. 2C. The wavelength filter 222 includes a plurality of branching ports 222$b$1, 222$b$2 . . . and 222$b$N, and a common port 222$c$. Each of the branching ports 222$b$1, 222$b$2 . . . and 222$b$N is associated with a distinct and specific wavelength channel "Ch1", "Ch2" . . . or "Ch N". Each branching port 222$b$1, 222$b$2 . . . or 222$b$N is respectively connected with an ONU 206-1 . . . 206-N. The wavelength filter 222 can receive an upstream MLM signal at a branching ports 222$b$1, 222$b$2 . . . or 222$b$N from an ONU 206-1 . . . 206-N, and filter (or slice) the spectrum of the upstream MLM signal. The wavelength filter 222 then outputs an upstream spectrum-sliced signal at the common port 222$c$ (via feeder fiber 218). The spectrum of the upstream spectrum-sliced signal is located in the specific wavelength channel associated with the branching port 222$b$1, 222$b$2 . . . or 222$b$N at which the upstream broad-spectrum signal is received. In other words, the spectrum of the upstream spectrum-sliced signal output at the common port 222$c$ is determined by the wavelength channel associated with the branching port 222$b$1, 222$b$2 . . . or 222$b$N at which the input upstream MLM signal is received.

Each ONU 206-1 . . . 206-N can include a transmitter 228-1 (or 228-2 . . . 228-N) for providing a MLM upstream optical signals and a receiver 220-1 (or 220-2 . . . 220-N) for receiving downstream optical signals and a signal separating/combining device 224-1 (or 224-2 . . . 224-N). Each ONU 206-1, 206-2 . . . 206-N is connected with a branching port 222$b$1, 222$b$2 . . . 222$b$N of the wavelength filter 222 and is associated with a specific wavelength channel "Ch1", "Ch2" . . . "Ch N" of the wavelength filter 222. The wavelength filter 222 can be coupled with the ONUs 206-1 . . . 206-N by single-mode optical fibers. The MLM signals produced by the transmitters 228-1 . . . 228-N are sliced by the wavelength filter 222 to produce multiplexed upstream signals with specific wavelength channels determined by the branching ports 222$b$1, 222$b$2 . . . and 222$b$N of the wavelength filter 222.

The wavelength filter 222 can receive downstream spectrum-sliced signal via the feeder fiber 218 at the common port 222$c$. The downstream spectrum-sliced signal is characterized by a wavelength channel of one of the branching ports 212$b$1, 212$b$2 . . . and 212$b$N of the wavelength filter 212. The wavelength filter 222 can route the downstream spectrum-sliced signal to one of the branching ports 222$b$1, 222$b$2 . . . or 222$b$N in accordance with the wavelength channel of the downstream spectrum-sliced signal such that the wavelength channel of the downstream spectrum-sliced signal matches the wavelength channel of the receiving branching port 222$b$1, 222$b$2 . . . or 222$b$N. The downstream spectrum-sliced signal routed to a branching port 222$b$1, 222$b$2 . . . or 222$b$N is subsequently transmitted to one of the ONUs 206-1 . . . 206-N.

Figure 3B:
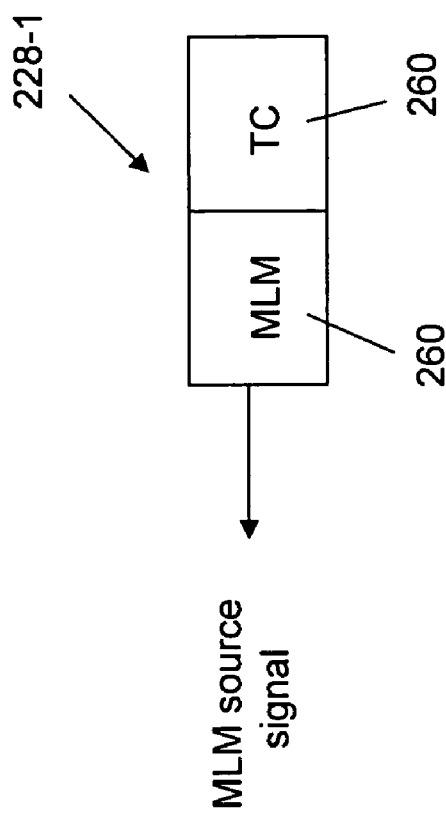

The receivers 220-1 . . . 220-N in the ONUs 206-1 . . . 206-N are configured to receive downstream signals that are transmitted through the specific filter channel. As an example, the ONU 206-1 and the OLT 209-1 share the same wavelength channel—"Ch1". The ONU 206-2 and the transceiver port 209-2 share the same wavelength channel "Ch2", and so on. Each ONU 206-1 . . . 206-N includes a signal separating/combining device 224-1 (or 224-2 . . . 224-N), a transmitter 228-1 (or 228-2 . . . 228-N), and a receiver 220-1 (or 220-2 . . . 220-N). The transmitters 228-1 . . . 228-N can be MLM sources, which may have different implementations from the transmitter 208-1 . . . 208-N. FIG. 3B shows an exemplified implementation of the transmitter 228-1 at the ONU 206-1. The transmitter 218-1 includes a MLM source 260 and a temperature controller 261 that can control the temperature of the MLM source 260. The temperature controller 261 can be a thermal electric temperature controller that is built-in the MLM transmitter 228.

It should be noted that although an ONUs 206-1 . . . 206-N and its counterpart transceiver port 209-1 . . . 209-N in the OLT 202 share the communication tasks in each channel "Ch1", "Ch2" . . . or "ChN", they do not have to operate in exactly the same wavelength range for both downstream and upstream transmission. For example, utilizing the cyclic features in the case of AWGs as the wavelength filters 212 and 222, the downstream and upstream signals can occupy different wavelengths, which are separated by a multiple of FSRs.

The transmitter 228-1 . . . 228-N can produce MLM upstream signals to be sent to the common port 222$c$ at the wavelength filter 222 wherein the MLM upstream signals are sliced (or filtered) into specific wavelength channels. For example, the MLM upstream signal from the ONU 206-1 is filtered by the wavelength filter 222 to produce a spectrum-sliced upstream signal in the wavelength channel "Ch 1" that is also specific to the transceiver port 209-1. The spectrum-sliced upstream signal can be amplified if necessary, passing through the wavelength filter 212 and the signal separating/combining device 214-1, and being received by the receiver 210-1 in the transceiver port 209-1.

In the downstream direction, the MLM optical signal produced by the transmitter 208-1 passes the signal separating/combining device 214-1 and is sliced (or filtered) by the wavelength filter 212 into a spectrum-sliced downstream signal in the wavelength channel "Ch 1". The spectrum-sliced downstream signal is next amplified if necessary and transmitted to the wavelength filter 222 at the RN 204. The wavelength filter 222 then routes the spectrum-sliced downstream signal in "Ch 1" to the ONU 206-1 that is characterized by the same wavelength channel "Ch 1". As described, each of the ONUs communicates downstream or upstream in its specific wavelength channel within each system. The secure wavelength specific communications in the disclosed system is a significant improvement over the broadcasting mode of communications in some conventional systems.

Figure 4A:
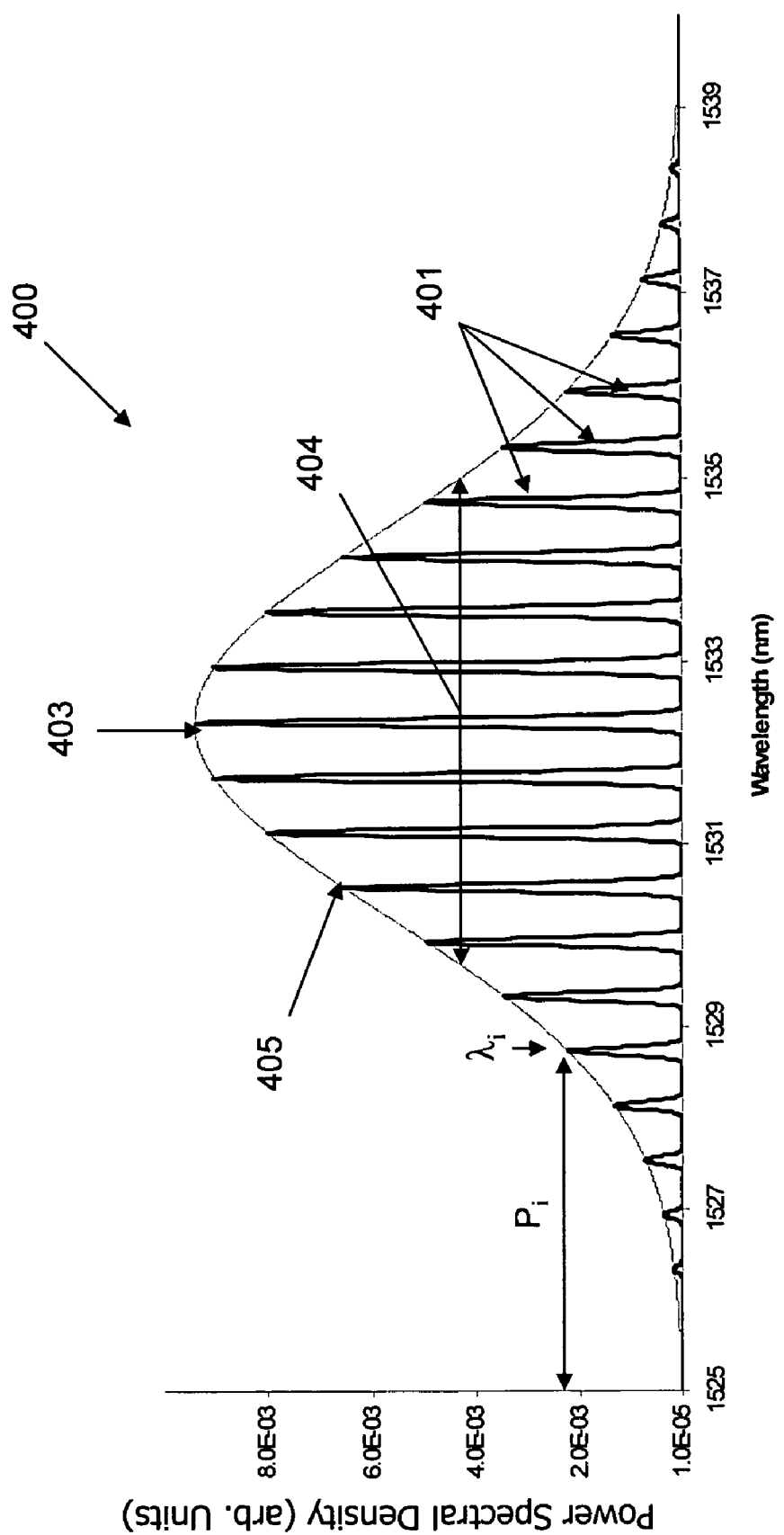
FIG. 4A illustrates the emission spectrum of an MLM source in accordance to the present specification.
Figure 4B:
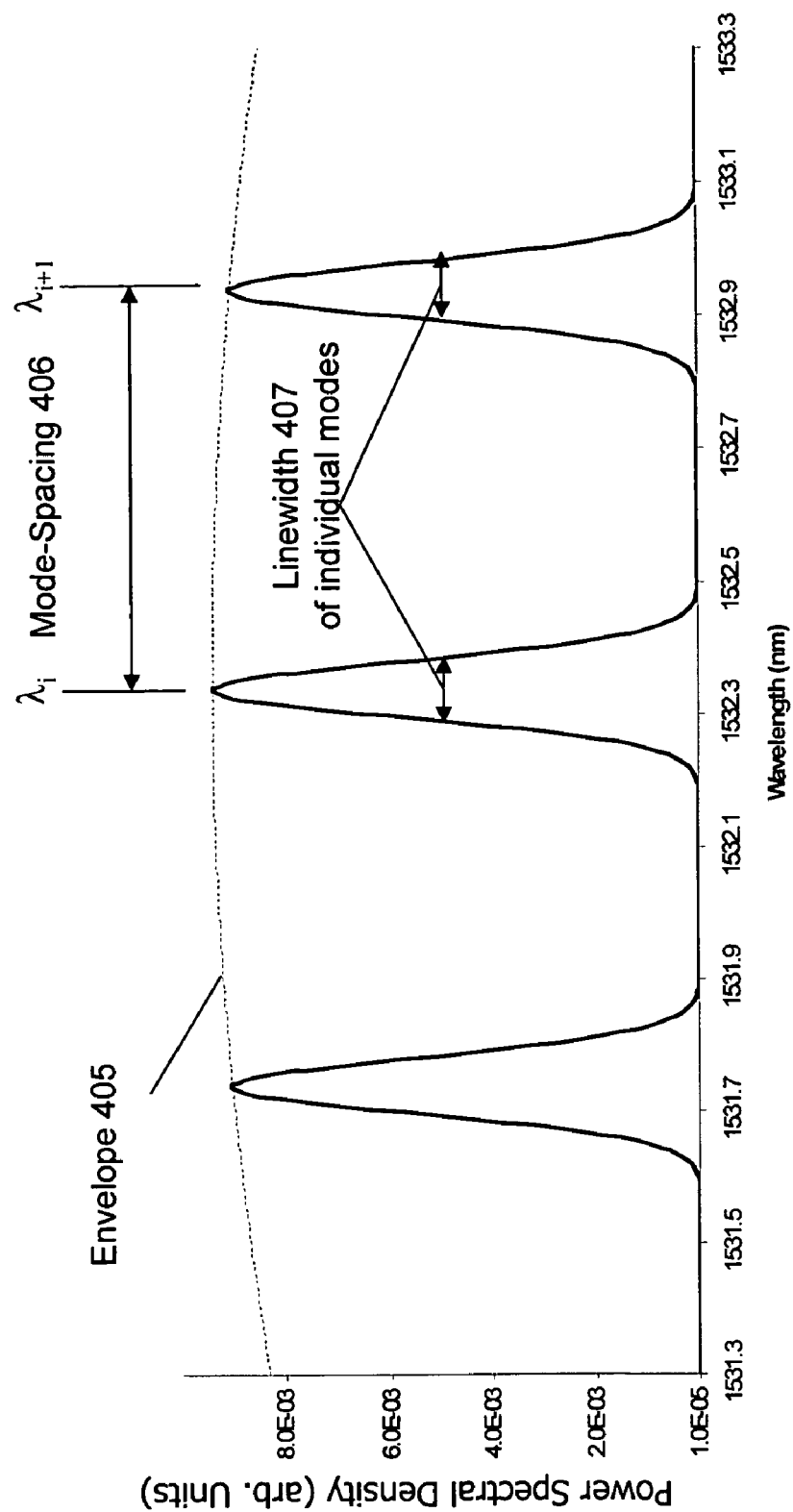
FIG. 4B is an expanded view of the emission spectrum of an MLM source illustrating the spectral profiles of individual modes and the spacing between the modes.

FIG. 4A illustrates the emission spectrum 400 of a typical MLM source. FIG. 4B is an expanded view of the emission spectrum of a typical MLM source. The emission spectrum 400 includes a plurality of individual emission modes 401. The envelope 405 of the individual emission modes 401 is formed by joining all the peaks of the modes 401, and only serves as a visual guide. In the present specification, the center wavelength (CW) 403 of the MLM emission spectrum can be defined by the power-weighed average of the peaks of the individual modes 401: $CW_{MLM}=\Sigma(p_i*\lambda_i)/\Sigma(p_i)$ where $p_i$ and $\lambda_i$ are the power (in linear units) and the center wavelength of individual modes respectively. The summation covers over all the peaks within 20 dB range of the strongest peak. In accordance with one aspect of the present specification, the side-modes in the MLM sources are not suppressed; instead the side modes are used to achieve desirable spectrum-slicing effects by the wavelength filter.

An effective width 404 of the MLM emission spectrum can be defined by the spectral FWHM of the envelope 405. The spectral width of envelope 405 of the MLM emission spectrum can commonly be represented by the full width at specific "x" decibel value (dB) below the maximum (PWxdB). A common specification of the spectral width is the full width at half the maximum (FWHM), which is equivalently to PW3 dB. Analogously, the pass bands 415 of the wavelength channel of a wavelength filter can be defined in the same fashion and labeled as BWxdB. Each modal peak has a spectral line width 407. The spacing 406 between adjacent individual modes is defined by the wavelength difference between the neighboring peaks $\lambda_{i+1}-\lambda_i$. The line width (FWHM) 407 of an individual modal peak is typically much narrower than 1 nm. The mode spacing 406 is not restricted in the current specification if part or all of the subsequent controls are implemented.

In accordance to the present specification, the emission spectrum of a MLM source can be tuned like a tunable laser to cover part or all the wavelength channels of the wavelength filters 212 and 222. FIG. 5A illustrates the spectral distribution of the wavelength channels of the wavelength filters (e.g. 212, 222,) at center wavelengths $\lambda_1 \lambda_2 \ldots \lambda_N$. FIG. 5B illustrates the spectrum of a MLM source at two different temperatures $T_1$ and $T_2$. FIG. 5C illustrates the temperature dependence of the center wavelength of a typical MLM source. MLM sources such as the Fabry-Perot lasers have large temperature sensitivity, which allows the center wavelength of the emission spectrum of the MLM source to be tuned with relatively small variation of the temperature. For example, the temperature sensitivity of the emission wavelength of a Fabry-Perot laser can be more than 0.4 nm/° C. It is therefore possible to use transmitters based on the same Fabry-Perot laser to cover a large number (e.g. 32, 40 and 48) of the wavelength channels in a given optical communication system 200. A 100 GHz spacing wavelength filter will occupy ~25 nm of spectral range for 32 channels in the C-band, A 50 degree of temperature tuning can cover the same spectral range for a temperature sensitivity factor of 0.5 nm/° C. The temperature controllers 251 and 261 as shown in FIGS. 3A and 3B can be controlled to set the MLM sources to different temperature set-points such that the respective transmitters can provide stable MLM source signal for wavelength channels in different wavelength ranges. It should be noted that the thermal tuning of the center wavelength of an emission spectrum is applicable to other optical sources such as LED and SLD sources.

An important feature of the optical communication system 200 is that the transmitters 208-1, 208-2 ... 208-N and transmitters 228-1, 228-2 ... 228-N are adaptive to the spectral pass bands of the wavelength channels "Ch1", "Ch2" ... "ChN". In the present specification, the spectral adaptability to the wavelength channels by the transmitters is achieved by automatic tuning of the temperature of each transmitter in the system. The controlled temperature change of a MLM light source (i.e. Fabry-Perot laser) can cause a shift in the center wavelength of the emission spectrum such that one strong mode of the MLM source aligning with the particular wavelength channel. The spectral shift can also be monitored by measuring the optical output power at the corresponding receiving side of the system. For example, as the temperature of the transmitter 228-1 is controlled to change, the center wavelength of emission spectrum of the transmitter 228-1 will shift relative to the pass band of the wavelength channel "Ch-1". The optical power of the upstream spectrum-sliced signal detected at the corresponding receiver 210-1 will vary based on the relative spectral positions of the emission spectrum and the pass band of the channel. This information of power variation of the upstream spectrum-sliced signal detected 210-1 can be sent downstream by the transmitter 208-1 to be used as a feedback to control/adjust the temperature setting of the transmitter 228-1. Conversely, as the temperature of the transmitter 208-1 is controlled to change, the center wavelength of emission spectrum of the transmitter 208-1 will shift relative to the pass band of the wavelength channel "Ch-1". The optical power of the downstream spectrum-sliced signal detected at the corresponding receiver 220-1 will vary based on the relative spectral positions of the emission spectrum and the pass band of the channel. This information of power variation of the downstream spectrum-sliced signal detected 220-1 can be sent upstream by the transmitter 228-1 to be used as a feedback to control/adjust the temperature setting of the transmitter 208-1.

Figure 6:
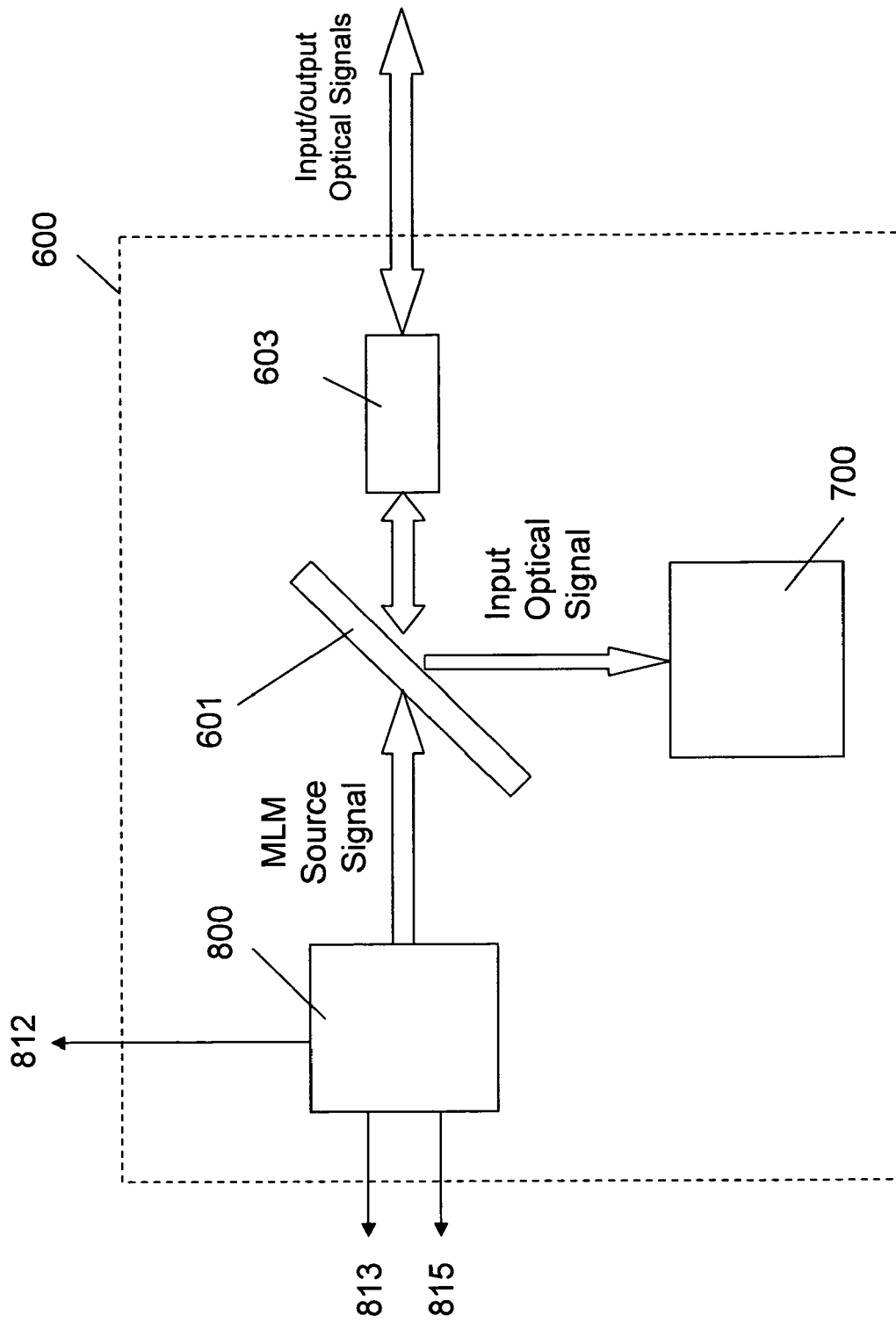
FIG. 6 is a block diagram of an integrated bi-directional optical sub-assembly (OSA).
Figure 7A:
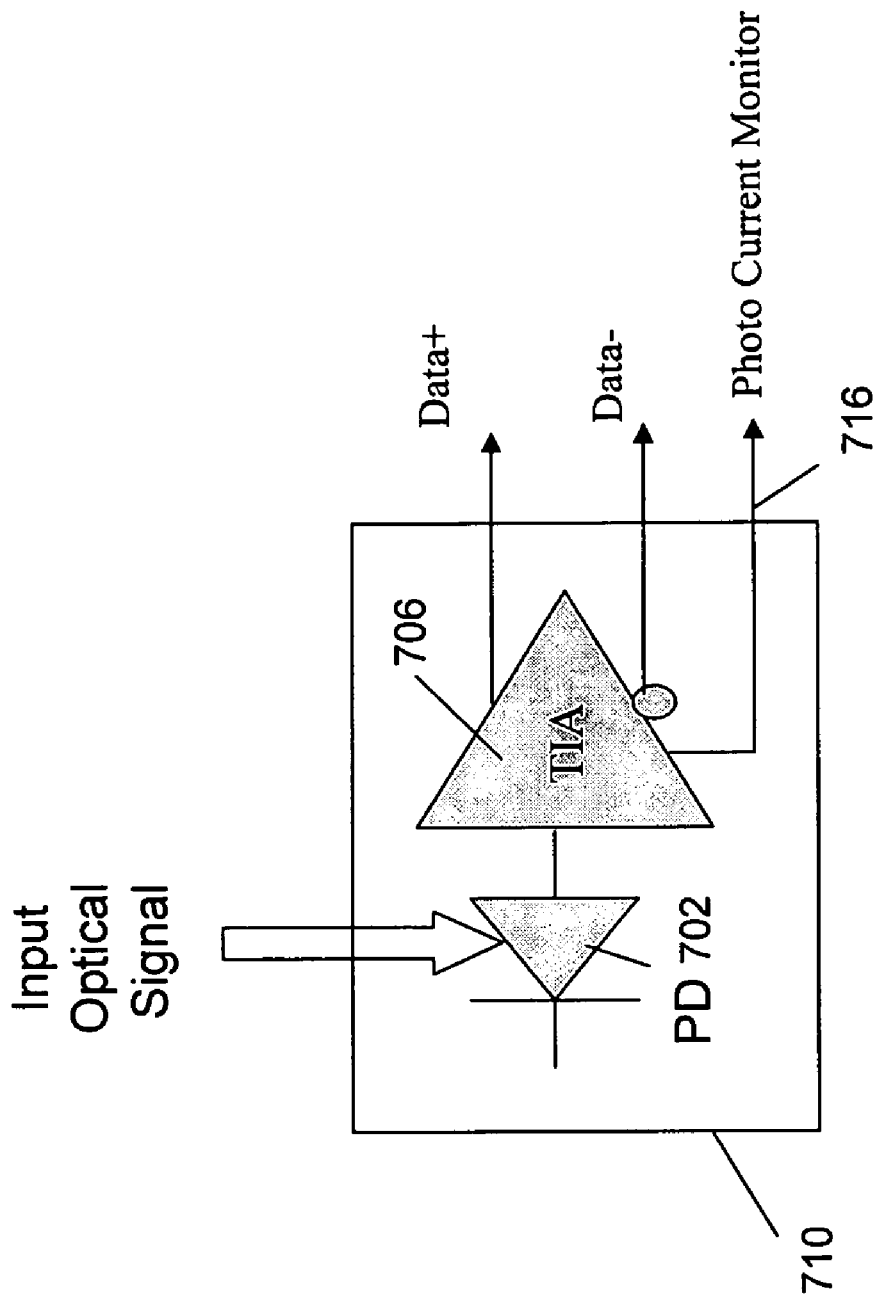
FIG. 7A is a block diagram of a receiver optical sub-assembly (ROSA).

FIG. 6 is a block diagram of a bi-directional optical sub-assembly (OSA) 600. A MLM transmitter optical sub-assembly (TOSA) 800, a receiver optical sub-assembly (ROSA) 700, and a signal separating/combining WDM filter 601 are integrated into the unitary bi-directional OSA 600. In some implementations, an optical lens or collimator 603 can be provided to efficiently couple input/output lights at a common input/output port. The ROSA 700 is aligned precisely to receive the incoming optical signal deflected by the WDM filter 601 at a specific angle, for example 45°. An implementation of the ROSA 700 is illustrated in FIG. 7A. The most commonly used WDM filter 601 is a thin-film filter that is designed such that specific wavelength optical signal can be reflected with little loss and be intercept by the ROSA 700. The MLM source signal produced by the TOSA 800 is intercepted by the WDM filter 601 also at a predetermined angle. The WDM filter 601 can pass the MLM source signals within a certain wavelength range with very little loss. Then the MLM source signal can be coupled into an external optical fiber at the input/output port. The MLM source signals propagating in the optical fiber can be guided to the branching ports of the wavelength filters 212 and 222 in the optical communication system 200, as described above. The integrated bi-directional optical sub-assembly 600 can therefore be a unitary device in the place of the transceiver ports 209-1, 209-2, or 209-N and the ONUs 206-1, 206-2 ... 206N. A feature of the integrated bidirectional optical sub-assembly 600 is that the input optical signals and the output MLM source signals can share the same input/output port in a unitary device.

A receiver optical sub-assembly (ROSA) often includes a signal-detect (SD) output. The signal detect is commonly implemented by a simple level comparator. In the present specification, the signal-detect signal can be used to provide a coarse feedback for the spectral alignment between a wavelength channel and the central wavelength of a MLM transmitter. When optical power is larger than a pre-determined level, the SD signal is asserted, otherwise, SD signal will be de-asserted. The assertion and de-assertion of the signal-detect signal indicate an alignment window of the MLM source relative to the pass band of a corresponding wavelength channel. The signal-detect signal can be used as a control signal to set the temperature of the MLM source. The SD signal is a binary output that only indicates two stages (good or bad) of wavelength alignment. Sometimes fine tuning capability is needed in the optical communication systems 200 in order to find the optimal position within the alignment window, which will improve the link budget and reliability. In these situations, a more accurate power level indicator such as an analog power monitor can be implemented in the ROSA.

FIG. 7A illustrates an ROSA 710 compatible with the ROSA 700 in the integrated bi-directional optical transceiver module 600. The ROSA 710 includes a photo diode 702 and a transimpedance amplifier (TIA) 706. The photo diode 702 is in connected with the transimpedance amplifier 706. The transimpedance amplifier 706 can convert photo-current signal received from the photo diode 702 to two differential voltage output signals "Data+" and "Data−". The transimpedance amplifier 706 includes an additional lead 716 that can simultaneously output an analog signal that is largely proportional to the photo-current of the photo diode 702, which can be used as an indicator of the optical power of the input optical signal. A beneficial feature of ROSA 710 is that the output analog photo-current signal can be conveniently used as a feedback signal for tuning temperature controlled transmitters (implemented at the place of transmitters 208-1 . . . 208-N and 228-1 . . . 228-N) in the optical communication system 200. TIA chips 706 including monitor functions are commercially available. For example, conventional ROSA based on transistor outline can package (TO-CAN) has 4 output pins. A 5-pin TO-CAN ROSA can be implemented to allow the monitor signal to be directly wire-bonded from a TIA chip.

Figure 7B:
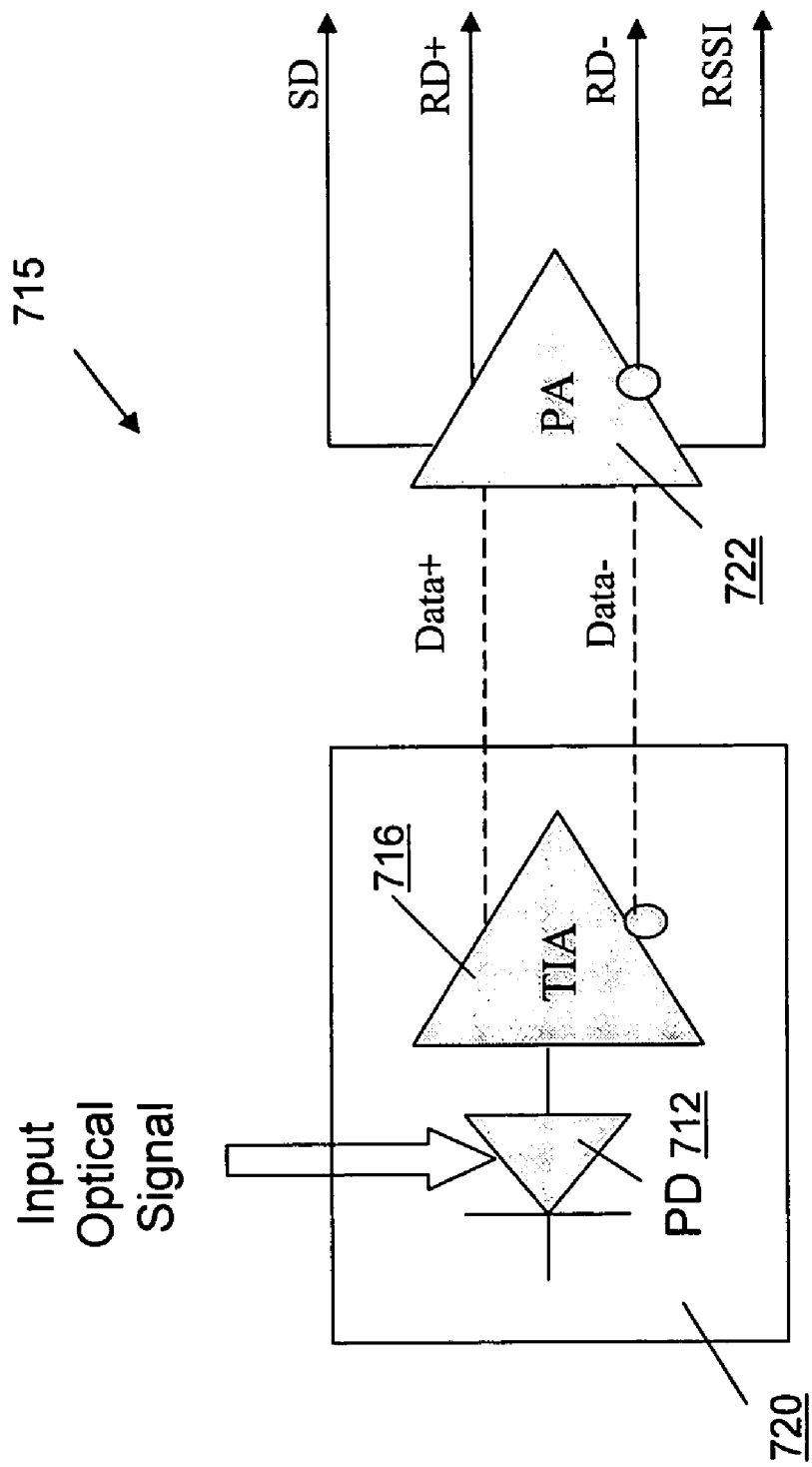
FIG. 7B is a block diagram of a receiver module with a relative signal strength indicator (RSSI) output.

FIG. 7B shows a receiver 715 including power monitoring capability. A conventional 4-pin ROSA 720 includes a photo diode 712 and a transimpedance amplifier (TIA) 716. The differential data output signals "Data+" and "Data−" of the transimpedance amplifier 716 are respectively connected with two inputs of a post amplifier 722. The post amplifier 722 outputs a signal-detect signal and a RSSI (Relative Signal Strength Indicator) signal. The RSSI signal is an analog signal that is largely proportional to the amplitude of the differential data signals "Data+" and "Data−". An AGC (Automatic Gain Control) loop is commonly implemented in the transimpedance amplifier 716, which disproportions the differential output signals "Data+" and "Data−". For example, when optical input power is very small, the transimpedance of the TIA 716 is very large and the differential output signals are sensitive to optical power variations. When optical input power increases, the AGC loop will reduce the transimpedance of TIA 716. As a result, the amplitude of differential output signals "Data+" and "Data−" has a non-linear relation with the optical input power. Thus, as an optical power strength indicator, RSSI has a large dynamic range but a poor linearity.

Figure 8A:
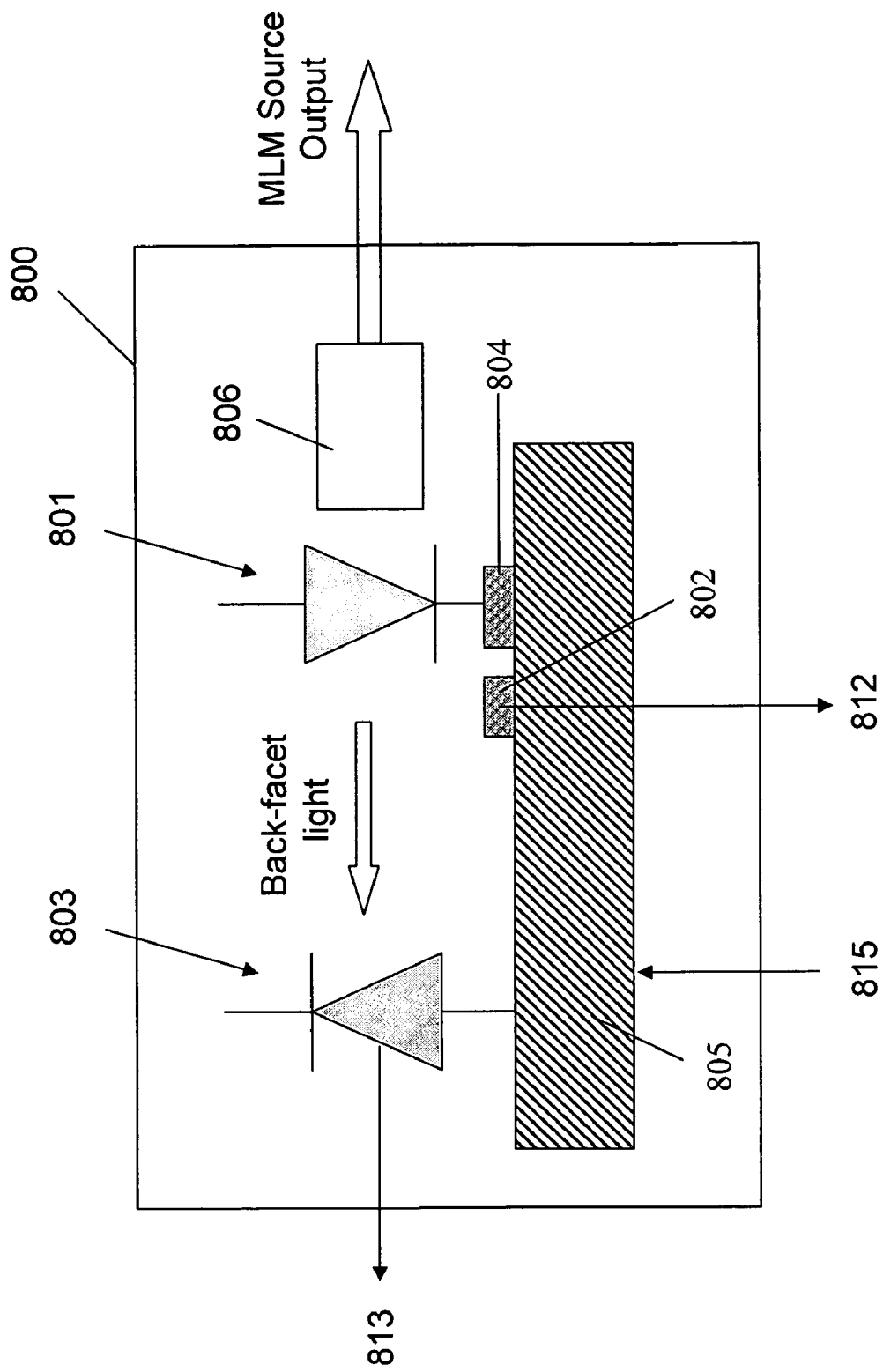
FIG. 8A is a block diagrams for an implementation of a temperature-controlled transmitter optical sub-assembly.
Figure 8B:
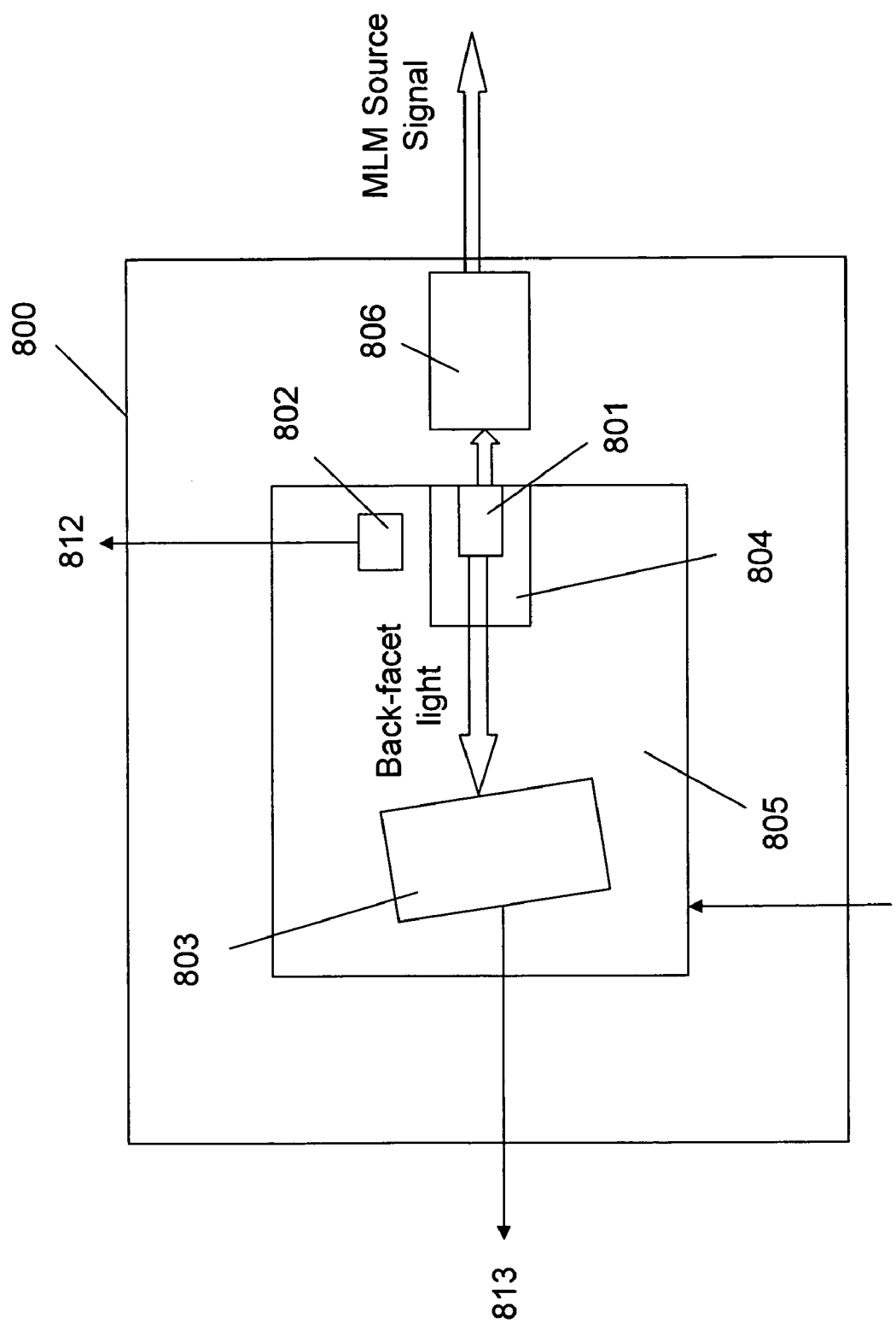
FIG. 8B illustrates an exemplary arrangement of the key components in the temperature-controlled transmitter optical sub-assembly of FIG. 8A.

FIG. 8A is a block diagrams for a temperature-controlled TOSA 800. The TOSA 800 contains a MLM source 801, a built-in temperature sensor 802, a heating and cooling device (H/C) 805, and a back-facet photo photodiode monitor 803. FIG. 8B illustrates a typical arrangement of each key components of the TOSA 800. The MLM source 801 can have an emission spectrum having characteristics as illustrated by FIG. 4A. The MLM source 801 can be implemented by a Fabry-Perot laser. In one embodiment, light emitted from the MLM source 801 is precision coupled to a lens or a collimating device 806.

A temperature sensor 802 is placed at the vicinity and in thermal communication with the MLM source 801 to monitor the operating temperature of the MLM source 801. The MLM source 801 can be mounted on a carrier plate 804. The carrier plate 804 and the temperature sensor 802 are mounted on the H/C 805. The H/C 805 can be controlled by an external signal 815. The H/C 805 can also control the temperature to a designated set-point in response to the temperature sensing signal 812 that is output by the temperature sensor 802 built-in the same unitary device. The H/C 805 can also control the temperature to a designated set-point in response to an external signal. The H/C 805 can be in the form an extended stage so it can support and be in thermal contact with multiple components. The carrier plate 804 and the temperature sensor 802 are in good thermal contact with the H/C 805.

In the optical communication system 200, the external signal 815 can be transmitted by the counterpart transmitter at the opposite end of the communication network. For example, the transmitters 208-1 and 228-1 can be implemented as the temperature-controlled TOSA 800. The temperature controller in the transmitter 228-1 can be controlled by a temperature control signal sent by the transmitter 208-1, and vice versa. The temperature control signal sent from the transmitter 208-1 to the transmitter 228-1 can be dependent on the power of the upstream optical signal sent from the transmitter 228-1 and received by the receiver 210-1. The interactive temperature controls between the transmitters 208-1 and 228-1 allow the temperatures of the transmitters 208-1 and 228-1 to be tuned such that the emission spectra of the transmitters 208-1 and 228-1 can be set to substantially the same wavelength channel.

Figure 8C:
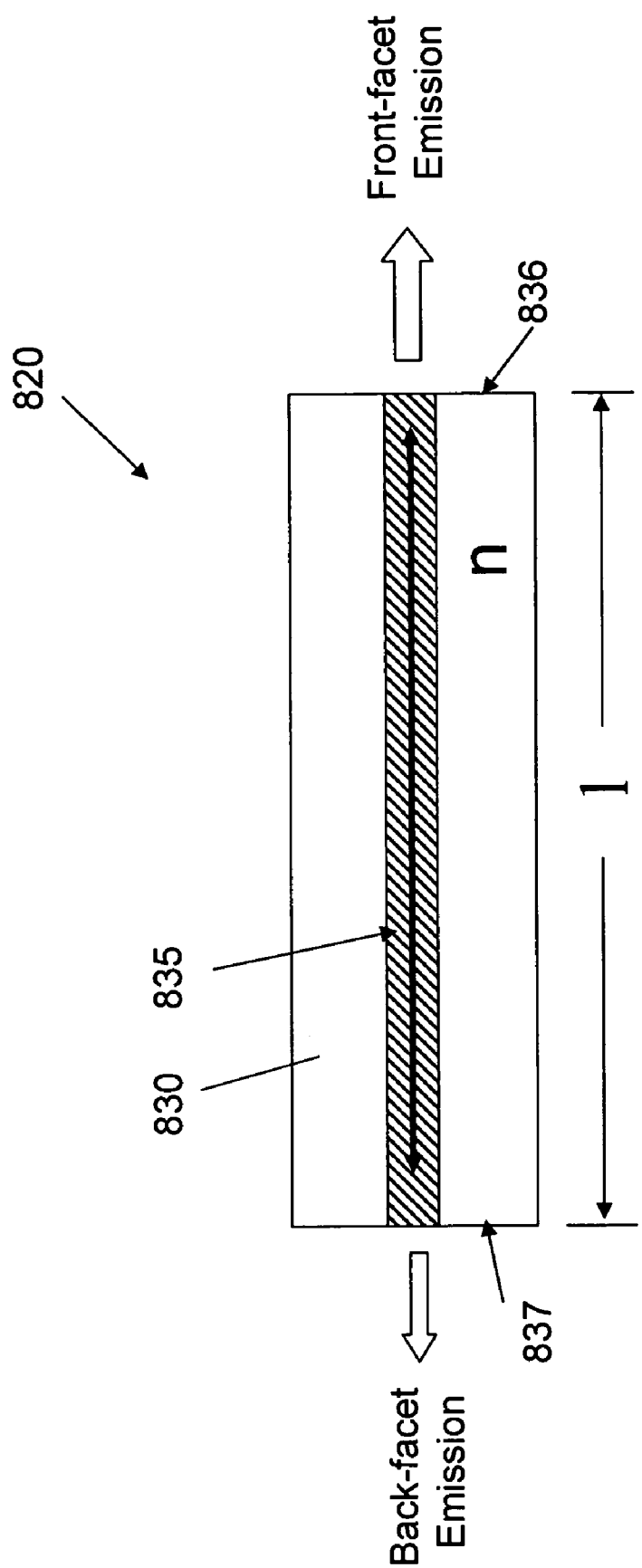
FIG. 8C is a cross sectional view of a Fabry-Perot laser cavity.

In one embodiment, the MLM source 801 is a Fabry-Perot semiconductor laser 820, as shown in FIG. 8C. The Fabry-Perot semiconductor laser 820 includes a cavity 830. The cavity 830 includes a front facet 836 and a back facet 837. Each end facet of the cavity 830 is appropriately coated to reflect the laser light back and forth in the cavity 830. As the light reflects between the both ends of the cavity the allowable modes of the MLM source must satisfy the wavelength condition: $\lambda_m = 2 \times L \times n/m$. where n is the refractive index in the cavity, m is an integer, L is the length of the laser cavity and $\lambda_m$ is the peak wavelength. Semiconductor materials usually can emit lights at a wide spectral range. The laser cavity 830 is usually much longer than the wavelengths emitted by the semiconductor materials. Thus, the emissions can include a plurality of modes each characterized by a different central wavelength as shown in FIG. 4A. Each individual spectral peak is referred as one longitudinal mode and a Fabry-Perot laser exemplify a typical multi-longitudinal mode (MLM) source.

In the optical communication system 200, it is sometimes desirable to broaden the FWHM of spectral envelop 405 of the MLM sources and increase the temperature coefficient of the central wavelength. These can be accomplished by controlling the properties of the semiconductor materials selected in the Fabry-Perot laser.

The optical emissions exiting the back facet of the MLM source 801 can be received and monitored by a photo-diode monitor 803. The photo current of the photo-diode monitor 803 can be used to produce a signal 813 that is indicative of the optical power of the MLM source 801.

Bidirectional OSA is a commonly used component in optical transceivers. A conventional bidirectional OSA package 900 is shown in FIG. 9A. The key components in the bidirectional OSA 900 include a WDM filter 909, a TO-CAN TOSA 907, and a TO-CAN ROSA 905. A housing block 903 holds all the components together. The output light from the TO-CAN TOSA 907 directly passes the WDM filter 909, and is coupled into an external optical fiber at a fiber port 901. The fiber port 901 may also include a sleeve, a ferrule, a lens, and a stress relief boot. Usually, the input light signal from the same fiber port has a different wavelength compare to the output light from TO-CAN TOSA 907. The input light is reflected by the filter 909, and is then received by TO-CAN ROSA 905.

In comparison, FIG. 9B shows the structure of a tunable MLM bidirectional OSA 920 in accordance with the present specification. Similar to the bidirectional OSA package 900, the tunable MLM bidirectional OSA 920 includes a WDM filter 929, a TO-CAN ROSA 925, a housing block 923, and a fiber port 921. The spectral distributions of the MLM sources (e.g. 208-1 and 228-1) in the above described optical communication systems 200 can be tuned using a temperature controller, as shown in FIGS. 3A, 3B and 8A, 8B. The tunable MLM bidirectional OSA 920 includes a tunable MLM TOSA 927. A temperature controller can be integrated in the tunable MLM TOSA 927. The input and output signals of the tunable MLM TOSA 927 should include but not limited to high-speed differential signals, a temperature sensing signal 812, and a temperature control signal 815 as outlined above in relation to FIG. 8. ROSA 925 includes normal differential data signals and also an additional output leads 935 that can provide power level indicator based on the current of the photodiode in the ROSA 925 (also as described above in FIG. 7A).

Figure 10:
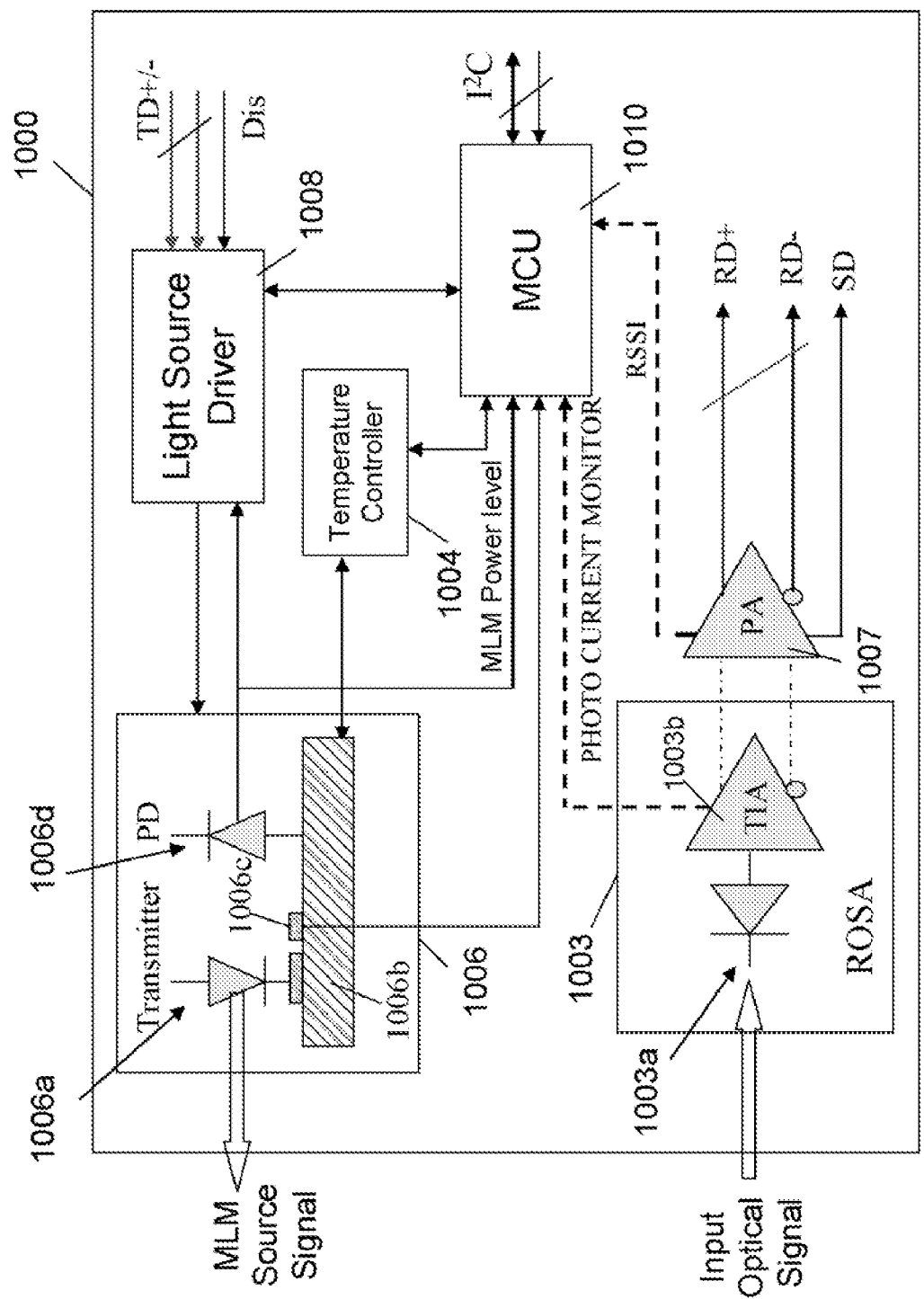
FIG. 10 is a block diagram of a transceiver module in accordance with an embodiment of the present specification.

FIG. 10 is a block diagram of an optical transceiver module 1000 in accordance with the present specification. The transceiver module 1000 includes a temperature controller 1004, a TOSA 1006, a light source driver 1008, a ROSA 1003, and a micro-controller unit (MCU) 1010 having an inter-integrated circuit (I2C) interface. The TOSA 1006 can be a tunable MLM source that is compatible with a high speed WDM-PON system such as the optical communication system 200.

The optical transceiver module 1000 has more functions that are crucial to the implementation of the optical communication systems 200. The TOSA 1006 can include a transmitter 1006a, and a heating and cooling device 1006b. The transmitter 1006a can be an MLM source, such as a Fabry-Perot laser, having an emission spectrum with characteristics as illustrated by FIGS. 4A-4B. The light source driver 1008 can be for example a laser driver for the Fabry-Perot laser. High speed differential signals for light source driver 1008 are connected with "TD+" and "TD−". The light source driver can be disabled through the control signal "Dis".

The operating temperature of the transmitter 1006a can be monitored by a temperature sensor 1006c. The output signal from the temperature sensor 1006c can be used by the MCU 1010 to control the H/C device 1006b that controls the temperature of the transmitter 1006a. The central wavelength of the transmitter 1006a is dependent on temperature. The transmitter 1006a is thus a low cost light source whose emission spectrum can be externally tuned by control its operation temperature. The TOSA 1006 can further includes a photo detector 1006d that can detect the back-facet emission intensity of the MLM source and output a MLM power signal to be received by either the MCU 1010 or the light source driver 1008. The MLM power signal can be used as a feedback signal to control the light source driver 1008 to ensure a stable MLM emission in the specified intensity.

The ROSA 1003 includes a photo detector (PD) 1003a and a transimpedance amplifier (TIA) 1003b. In one of the embodiments of current specification, ROSA 1003 can provide a photocurrent monitor signal that is approximately proportional to the power of the input optical signal. The high speed differential output signals from TIA 1003b are in connection with the input ports of a post amplifier 1007. The post amplifier 1007 then provides standard outputs including the high speed differential received signals (RD+ and RD−) and signal detect (SD) indicator. The post amplifier 1007 can also provide a RSSI signal. The power monitor signal that indicates the power of the input optical signal can be implemented as the photo-current monitor signal from the TIA 1003b or the RSSI signal from the post amplifier 1007 can be received and digitized by the MCU 1010 through an A-D converter. The host (i.e. OLT 102) can receive the optical power signal through the I2C interface or in optical signals from a remote optical transceiver module (e.g. at an ONU 104) and utilize it as a feedback signal to control the temperature of the transmitter at the remote optical transceiver module (e.g. ONU).

The present specification is described above with reference to exemplary embodiments. It will be apparent to those skilled in the art that various modifications may be made and other embodiments can be used without departing from the broader scope of the present specification. Therefore, these and other variations upon the exemplary embodiments are intended to be covered by the present specification.

What is claimed is:

1. An optical communication system, comprising:
  a plurality of first optical transceiver modules each comprising:
    a first transmitter configured to emit a downstream multi-longitudinal-mode (MLM) spectrum signal having an emission spectrum comprising a plurality of distinct narrow-spectrum peaks each corresponding to a longitudinal mode in the first transmitter, wherein the emission spectrum of the downstream multi-longitudinal-mode (MLM) spectrum signal is configured to be shifted in wavelength by a change in the temperature of the first transmitter;
    a first temperature controller configured to control the temperature of the first transmitter in response to a first temperature-control signal;
    a first receiver configured to receive the upstream optical signal;
    a first transimpedance amplifier (TIA) coupled to the first receiver, wherein the first transimpedance amplifier is configured to produce a first analog photo current monitor signal in response to the power of the upstream optical signal; and
    a first post amplifier coupled to the first transimpedance amplifier, wherein the first post amplifier is configured to produce a first relative signal strength indicator (RSSI) signal, wherein the first analog photo current monitor signal, or the first RSSI signal, or a combination thereof forms at least a portion of the first power-monitoring signal;
a first wavelength filter, comprising:
a plurality of first branching ports each associated with a specific wavelength channel, wherein each of the first branching ports is in connection with one of the first optical transceiver modules and is configured to receive the downstream MLM-spectrum signal from the first transmitter and send an upstream signal to the first receiver; and
a first common port configured to output a downstream signal in response to the downstream MLM-spectrum signal, wherein the spectrum of the downstream signal is located in a wavelength channel specifically associated with the first branching port at which the downstream MLM-spectrum signal is received;
a second wavelength filter comprising:
a plurality of second branching ports each associated with a specific wavelength channel, wherein each of the second branching ports is configured to receive an upstream MLM-spectrum signal; and
a second common port configured to output the upstream signal in response to the upstream MLM-spectrum signal, wherein the spectrum of the upstream signal is located in a wavelength channel specifically associated with the second branching port at which the upstream MLM-spectrum signal is received; and
a plurality of optical network units each comprising:
a second receiver configured to receive the downstream signal from the second branching port in connection with the optical network unit;
a second transmitter configured to emit the upstream MLM-spectrum signal to be sent to the second branching port in connection with the optical network unit, wherein the emission spectrum of the upstream MLM-spectrum signal comprises a plurality of distinct narrow-spectrum peaks each corresponding to a longitudinal mode in the second transmitter, wherein the emission spectrum of the upstream MLM-spectrum signal is configured to be shifted in wavelength by changing the temperature of the second transmitter;
a second temperature controller configured to control the temperature of the second transmitter in response to a second temperature-control signal,
wherein the downstream signal from the first transmitter in one of the plurality of first optical transceivers to the second receiver in one of the plurality of optical network units and the upstream signal from the second transmitter in the one of the plurality of optical network units to the first receiver in the one of the plurality of first optical transceivers are transmitted in a same wavelength channel;
a second transimpedance amplifier (TIA) coupled to the second receiver, wherein the second transimpedance amplifier is configured to produce a second analog photo current signal in response to the power of the downstream optical signal; and
a second post amplifier coupled to the second transimpedance amplifier, wherein the second post amplifier is configured to produce a second relative signal strength indicator (RSSI) signal, wherein the second analog photo current monitor signal, or the second RSSI signal, or a combination thereof forms at least a portion of the second power-monitoring signal.

2. The optical module of claim 1, wherein at least a portion of the second temperature-control signal is transmitted from the first transmitter in one of the plurality of first optical transceivers.

3. The optical module of claim 1, wherein at least a portion of the first temperature-control signal is transmitted from the second transmitter in one of the plurality of optical network units.

4. The optical module of claim 1, wherein one of the plurality of first optical transceiver modules comprises a first temperature sensor configured to produce at least a portion of the first temperature-control signal in response to the temperature of the first transmitter.

5. The optical module of claim 1, wherein one of the plurality of optical network units comprises a second temperature sensor configured to produce at least a portion of the second temperature-control signal in response to the temperature of the second transmitter.

6. The optical module of claim 1, wherein the spectra of downstream signal and the upstream signal in the same wavelength channel have substantially the same center wavelength or center wavelengths offset by one or multiple free spectral ranges (FSRs) of the first wavelength filter or the second wavelength filter.

7. The optical module of claim 1, wherein the emission spectrum of the upstream MLM spectrum source is characterized by a center wavelength that is configured to be shifted by more than 0.4 nm for a change of one Celsius degree in the temperature of the second transmitter.

8. The optical module of claim 1, wherein at least one of the plurality of first optical transceiver modules comprises a first micro controller configured to receive a first temperature sensing signal from the first temperature sensor and a first power-monitoring signal from the first receiver, and to produce the first temperature-control signal.

9. The optical transceiver module of claim 8, wherein the one of the plurality of first optical transceiver modules is a unitary device comprising the first micro controller, the first transmitter, the first temperature controller, and the first receiver.

10. The optical transceiver module of claim 1, wherein the micro controller is configured to receive a first temperature sensing signal from the first temperature sensor and a first analog photo current monitor signal from the first transimpedance amplifier (TIA) or the first relative signal strength indicator (RSSI) from the first post amplifier to produce the first temperature-control signal, wherein the first analog photo current monitor signal, or the first RSSI signal, or a combination thereof forms at least a portion of the second power-monitoring signal.

11. The optical transceiver module of claim 10, wherein the one of the plurality of first optical transceiver modules is a unitary device comprising the first micro controller, the first transmitter, the first temperature controller, the first receiver, the first TIA and the first post amplifier.

12. The optical transceiver module of claim 1, wherein the one of the plurality of optical network units is a unitary device comprising the second transmitter, the second temperature controller, and the second receiver.

13. The optical transceiver module of claim 1, wherein at least one of the plurality of optical network units comprises a second micro controller configured to receive a second temperature sensing signal from the second temperature sensor and a second power-monitoring signal from the second receiver, and to produce the second temperature-control signal.

14. The optical communication system of claim 13, wherein the one of the plurality of optical network units is a unitary device comprising the second micro controller, the second transmitter, the second temperature controller, and the second receiver.

15. The optical communication system of claim 1, wherein the plurality of distinct narrow-spectrum peaks in the emission spectrum of the downstream MLM-spectrum signal are characterized by an envelope whose full-width at half the maximum is equal to or greater than 1 nanometer.

16. The optical communication system of claim 1, wherein the plurality of distinct narrow-spectrum peaks in the emission spectrum of the upstream MLM-spectrum signal are characterized by an envelope whose full-width at half the maximum is equal to or greater than 1 nanometer.

17. The optical communication system of claim 1, wherein each of the plurality of first optical transceivers is associated with one of the plurality of optical network units, and wherein the first transmitter in one of the first optical transceivers is configured to tune the second transmitter in the associated optical network units such that the upstream signal and the downstream signal between the first optical transceiver and the associated second transceiver are in a same wavelength channel.

18. The optical communication system of claim 1, wherein a portion of the second temperature-control signal is transmitted from the first transmitter in one of the plurality of first optical transceiver modules, wherein the first transmitters and the second transmitter associated with the second temperature-control signal in one of the plurality of optical network units are configured to transmit optical signals in the same wavelength channel.

19. The optical communication system of claim 1, wherein a portion of the first temperature-control signal is transmitted from the second transmitter in one of the plurality of optical network units, wherein the second transmitters and the first transmitter associated with the first temperature-control signal in one of the plurality of first optical transceiver modules are configured to transmit optical signals in the same wavelength channel.

20. The optical communication system of claim 1, wherein the first optical transceiver module is a unitary device comprising the first transmitter, the first temperature controller, the first receiver, the first TIA, and the first post amplifier.

* * * * *